(12) United States Patent
Hu et al.

(10) Patent No.: US 12,025,775 B2
(45) Date of Patent: Jul. 2, 2024

(54) OPTICAL IMAGING SYSTEM

(71) Applicant: ZHEJIANG SUNNY OPTICS CO., LTD., Zhejiang (CN)

(72) Inventors: Yabin Hu, Zhejiang (CN); Tao Feng, Zhejiang (CN)

(73) Assignee: ZHEJIANG SUNNY OPTICS CO., LTD., Ningbo (CN)

( * ) Notice: Subject to any disclaimer, the term of this patent is extended or adjusted under 35 U.S.C. 154(b) by 691 days.

(21) Appl. No.: 17/059,486

(22) PCT Filed: Mar. 8, 2019

(86) PCT No.: PCT/CN2019/077464
§ 371 (c)(1),
(2) Date: Nov. 30, 2020

(87) PCT Pub. No.: WO2019/237776
PCT Pub. Date: Dec. 19, 2019

(65) Prior Publication Data
US 2021/0215909 A1   Jul. 15, 2021

(30) Foreign Application Priority Data
Jun. 15, 2018  (CN) .......................... 201810619726.1

(51) Int. Cl.
*G02B 13/00* (2006.01)
*G02B 9/62* (2006.01)
*G02B 13/06* (2006.01)

(52) U.S. Cl.
CPC .......... *G02B 13/0045* (2013.01); *G02B 9/62* (2013.01); *G02B 13/06* (2013.01)

(58) Field of Classification Search
CPC ....... G02B 9/62; G02B 13/0045; G02B 13/06
See application file for complete search history.

(56) References Cited

U.S. PATENT DOCUMENTS 9,897,782 B1    2/2018  Tsai et al.
2012/0229917 A1*  9/2012  Huang ............... G02B 13/0045
                                           359/713

(Continued)

FOREIGN PATENT DOCUMENTS

| CN | 201611405 U | 10/2010 |
| CN | 103529538 A | 1/2014 |
| CN | 103713380 A | 4/2014 |

(Continued)

*Primary Examiner* — George G. King
(74) *Attorney, Agent, or Firm* — Samson G. Yu

(57) ABSTRACT

The disclosure discloses an optical imaging system. The optical imaging system includes, sequentially from an object side to an image side along an optical axis, a first lens, a second lens, a third lens, a fourth lens, a fifth lens, and a sixth lens. The first lens has a focal power, and an object side surface thereof is a convex surface; the second lens has a focal power; the third lens has a focal power, and an image side surface thereof is a convex surface; the fourth lens has a focal power, an object side surface thereof is a convex surface, and an image side surface thereof is a concave surface; the fifth lens has a positive focal power, and an object side surface thereof is a convex surface; and the sixth lens has a negative focal power, and an object side surface thereof is a concave face.

20 Claims, 20 Drawing Sheets

(56) References Cited

U.S. PATENT DOCUMENTS

2018/0314039 A1\* 11/2018 Dai ........................ G02B 13/18
2018/0329179 A1\* 11/2018 Chang .................. G02B 13/146

FOREIGN PATENT DOCUMENTS

| CN | 105629446 A | 6/2016 |
| CN | 108152934 A | 6/2018 |
| CN | 108802972 A | 11/2018 |
| CN | 208477194 A | 2/2019 |

\* cited by examiner

OPTICAL IMAGING SYSTEM

CROSS REFERENCE TO RELATED APPLICATIONS

The present application claims the priority and benefit of Chinese Patent Application No. 201810619726.1, filed with the China National Intellectual Property Administration (CNIPA) on Jun. 15, 2018, which is incorporated herein by reference in its entirety.

TECHNICAL FIELD

The disclosure relates to an optical imaging system, and more particularly, the disclosure relates to a wide-angle camera lens including six lenses.

BACKGROUND

With the popularization of applications of portable electronic products such as mobile phones and tablet computers, people have higher and higher requirements on the photographing function of the portable electronic products. On the one hand, as portable electronic products tend to be miniaturized, the total length of the camera lens is limited, thereby increasing the difficulty in designing the camera lens. On the other hand, with the improvement of the performance and the reduction of the size of common photosensitive elements such as a charge coupled device (CCD) or a complementary metal oxide semiconductor (CMOS) element, the number of pixels of the photosensitive elements is increased and the size of the pixels thereof is reduced, thereby providing higher requirements on the high imaging quality and miniaturization of matched imaging camera lenses.

Meanwhile, in dual-camera technology newly applied in the photographing function of mobile phones, optical zooming is realized by combining two optical imaging systems of different focal lengths with an image processing algorithm. In order to achieve a good zoom effect, the dual-camera needs to include a wide-angle camera lens having characteristics such as wide field of view and large depth of field. In the case of the same size of the sensor image surface, the wider the full field of view of the camera lens is, the larger the amount of information contained in the picture to be photographed is, and therefore, there is a demand for camera lenses having a wider full field of view so as to further improve the photographing performance.

SUMMARY

Some embodiments of the disclosure provides an optical imaging system, such as a wide-angle camera lens, which is applicable to portable electronic products and can at least solve or partially solve at least one of the aforementioned shortcomings of the related art.

The disclosure provides an optical imaging system, the optical imaging system including, sequentially from an object side to an image side along an optical axis, a first lens, a second lens, a third lens, a fourth lens, a fifth lens, and a sixth lens. Wherein the first lens has a focal power, and an object side surface thereof may be a convex surface; the second lens has a focal power; the third lens has a focal power, and an image side surface thereof may be a convex surface; the fourth lens has a focal power, an object side surface thereof may be a convex surface, and an image side surface thereof may be a concave surface; the fifth lens may have a positive focal power, and an object side surface thereof may be a convex surface; and the sixth lens may have a negative focal power, and an object side surface thereof may be a concave surface.

In one embodiment, a maximum half field of view (HFOV) of the optical imaging system may satisfy $50°<HFOV<60°$.

In one embodiment, a curvature radius R7 of the object side surface of the fourth lens and a total effective focal length f of the optical imaging system may satisfy $0.4<R7/f<1.5$.

In one embodiment, the curvature radius R7 of the object side surface of the fourth lens and a curvature radius R8 of the image side surface of the fourth lens may satisfy $0.6<R7/R8<1.5$.

In one embodiment, an effective focal length f5 of the fifth lens, an effective focal length f6 of the sixth lens, and a total effective focal length f of the optical imaging system may satisfy $1<f5/f-f6/f<2$.

In one embodiment, a curvature radius R8 of the image side surface of the fourth lens and a curvature radius R9 of the object side surface of the fifth lens may satisfy $|R8-R9|<2$.

In one embodiment, a curvature radius R9 of the object side surface of the fifth lens and a curvature radius R11 of the object side surface of the sixth lens may satisfy $-1.2<R9/R11<-0.5$.

In one embodiment, a curvature radius R1 of the object side surface of the first lens and a curvature radius R6 of the image side surface of the third lens may satisfy $-1<(R1+R6)/(R1-R6)<0.5$.

In one embodiment, a maximum effective radius DT11 of the object side surface of the first lens and a maximum effective radius DT61 of the object side surface of the sixth lens may satisfy $2<DT61/DT11<3$.

In one embodiment, an axial distance SAG32 from an intersection point between the image side surface of the third lens and the optical axis to an effective radius vertex of the image side surface of the third lens and a center thickness CT3 of the third lens on the optical axis may satisfy $0.5<|SAG32/CT3|<1.2$.

In one embodiment, TTL is a Total Track Length from the object side surface of the first lens to an imaging surface of the optical imaging system, ImgH is a half of a diagonal length of an effective pixel region on an imaging surface of the optical imaging system, and ImgH and TTL satisfy TTL/ImgH 1.6.

In one embodiment, a combined focal length f45 of the fourth lens and the fifth lens and an entrance pupil diameter (EPD) of the optical imaging system may satisfy $1<f45/EPD<2.5$.

In one embodiment, a center thickness CT1 of the first lens on the optical axis, a center thickness CT2 of the second lens on the optical axis, a center thickness CT3 of the third lens on the optical axis, and a center thickness CT4 of the fourth lens on the optical axis may satisfy $0.5<CT3/(CT1+CT2+CT4)<1.3$.

In one embodiment, the first lens may have a positive focal power.

The disclosure uses a plurality of (for example, six) lenses, and by reasonably distributing the focal power and surface shape of each lens, the center thickness of each lens, and the axial spacing between the lenses, etc., the optical imaging system above is enabled to have at least one of the beneficial effects of ultra-thinness, miniaturization, wide angle, high imaging quality, etc.

BRIEF DESCRIPTION OF THE DRAWINGS

In conjunction with the drawings, other features, objects, and advantages of the disclosure will become more apparent from the following detailed description of non-limiting embodiments. In the drawings.

DETAILED DESCRIPTION OF THE EMBODIMENTS

Figure 1:
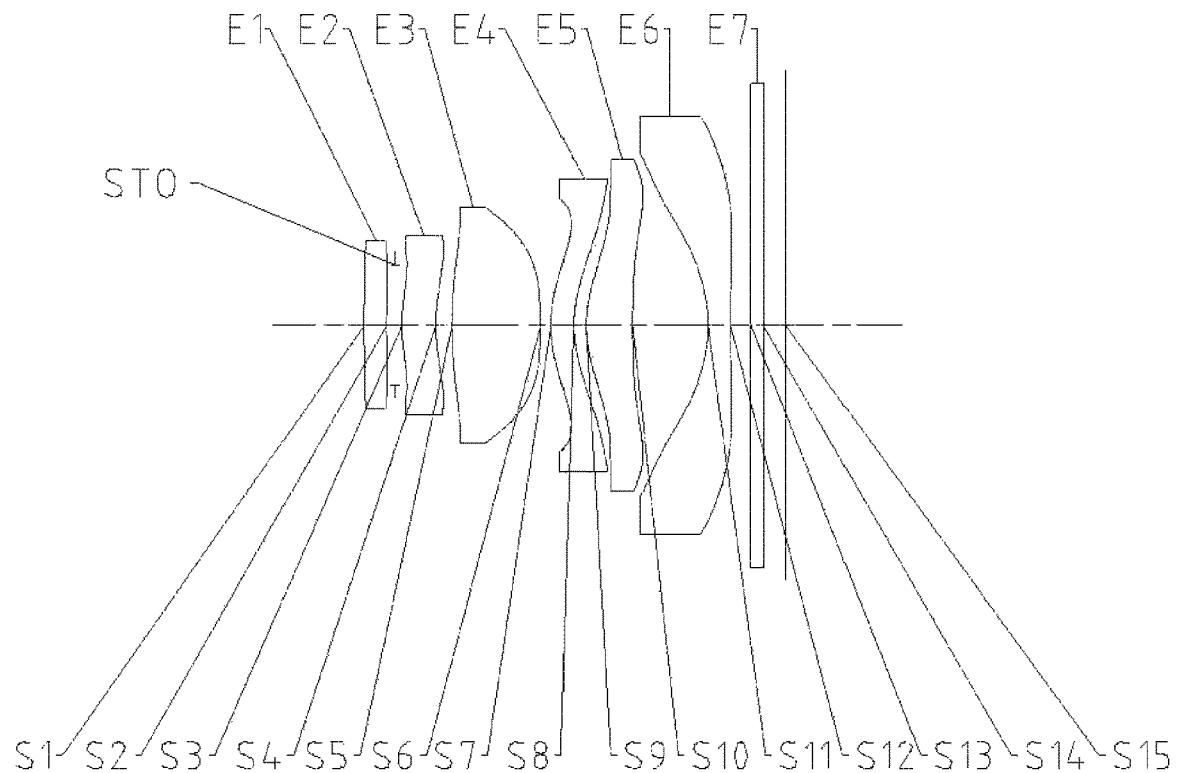
FIG. 1 shows a schematic structure diagram of an optical imaging system according to Embodiment 1 of the disclosure.

For a better understanding of the disclosure, various aspects of the disclosure will be described in more detail with reference to the drawings. It should be understood that these detailed descriptions are merely illustrative of exemplary embodiments of the disclosure and are not intended to limit the scope of the disclosure in any way. Throughout the description, the same reference signs refer to the same elements. The expression "and/or" includes any and all combinations of one or more of the associated listed items.

It should be noted that, in the present description, the expressions such as first, second, third, etc. are only used to distinguish one feature from another feature, and do not represent any limitation to the feature. Thus, a first lens discussed below may also be referred to as a second lens or a third lens without departing from the teachings of the disclosure.

In the drawings, the thickness, size and shape of the lenses have been slightly exaggerated for ease of illustration. In particular, the shapes of the spherical or aspherical surfaces shown in the drawings are illustrated by way of examples. That is, the shapes of the spherical or aspherical surfaces are not limited to the shapes of the spherical or aspherical surfaces shown in the drawings. The drawings are exemplary only and are not strictly drawn to a scale.

Herein, a paraxial region refers to a region near the optical axis. If the lens surface is a convex and the convex position is not defined, it indicates that the lens surface is convex at least in the paraxial region; and if the lens surface is concave and the concave position is not defined, it indicates that the lens surface is concave at least in the paraxial region. The surface of each lens closest to an object side is referred to as an object side surface of the lens; and the surface of each lens closest to an image side is referred to as an image side surface of the lens.

It will be further understood that the expressions "include", "including" "have" "include" and/or "including", when used in the present description, specify the presence of stated features, elements, and/or components, but do not preclude the presence or addition of one or more other features, elements, components, and/or combinations thereof. In addition, when an expression such as "at least one of . . . " appears followed a list of the listed features, said expression modifies all the listed features, rather than modifying individual element in the list. In addition, when describing embodiments of the disclosure, "may" is used to represent "one or more embodiments of the disclosure". Also, the term "exemplary" is intended to mean illustration or description by way of examples.

Unless otherwise defined, all terms (including technical terms and scientific terms) used in the present disclosure have the same meanings usually understood by the general technical personnel in the field of the present disclosure. It also should be understood that the terms (for example, terms defined in a common dictionary) should be explained to have meanings consistent with the meanings in the context of correlation technique and can not be explained with ideal or excessively formal meanings, unless clearly defined like this in the present disclosure.

It should be noted that the embodiments of the disclosure and the features in the embodiments can be used in combination without conflict. The disclosure will be described below with reference to the drawings and the examples in detail. The features, principles and other aspects of the present disclosure will be described below in detail.

The optical imaging system according to an exemplary embodiment of the disclosure may include, for example, six lenses having focal power, i.e., a first lens, a second lens, a third lens, a fourth lens, a fifth lens, and a sixth lens. The six lenses are arranged sequentially from an object side to an image side along an optical axis.

In an exemplary embodiment, the first lens has a positive focal power or a negative focal power, and an object side surface thereof may be a convex surface; the second lens has a positive focal power or a negative focal power; the third lens has a positive focal power or a negative focal power, and an image side surface thereof may be a convex surface; the fourth lens has a positive focal power or a negative focal power, an object side surface thereof may be a convex surface, and an image side surface thereof may be a concave surface; the fifth lens may have a positive focal power, and an object side surface thereof may be a convex surface; and the sixth lens may have a negative focal power, and an object side surface thereof may be a concave surface.

In an exemplary embodiment, the first lens may have a positive focal power.

In an exemplary embodiment, the optical imaging system according to the disclosure may satisfy the conditional expression 50°<HFOV<60°, wherein HFOV is a maximum half field of view of the optical imaging system. More specifically, HFOV may further satisfy 51.0° HFOV 58.1°. A full field of view of the system is controlled within a range of 100° to 120°, so that under the condition that the size of the image surface of the sensor is certain, the system has a wider full field of view, a relatively shorter focal length and an increased depth of field.

In an exemplary embodiment, the optical imaging system according to the disclosure may satisfy the conditional expression 0.4<R7/f<1.5, wherein R7 is a curvature radius of the object side surface of the fourth lens, and f is a total effective focal length of the optical imaging system. More specifically, R7 and f may further satisfy 0.47≤R7/f≤1.32. By controlling the ratio of the curvature radius of the object side surface of the fourth lens to the total effective focal length of the optical imaging system, the optical system thus can effectively correct astigmatism and distortion in the meridian direction, so as to achieve a good imaging effect.

In an exemplary embodiment, the optical imaging system according to the disclosure may satisfy the conditional expression |R8−R9|<2, wherein R8 is a curvature radius of the image side surface of the fourth lens, and R9 is a curvature radius of the object side surface of the fifth lens. More specifically, R8 and R9 may further satisfy 0≤|R8−R9|<1.8, for example, 0.04≤|R8−R9|≤1.74. By controlling the curvature radius of the image side surface of the fourth lens and the curvature radius of the object side surface of the fifth lens, and correcting magnification chromatic aberration by using a combination of a high refractive index and low Abbe number material and a low refractive index and high Abbe number material (relative to the high refractive index and low Abbe number material in the foregoing), a good imaging effect is achieved.

In an exemplary embodiment, the optical imaging system according to the disclosure may satisfy the conditional expression 0.6<R7/R8<1.5, wherein R7 is the curvature radius of the object side surface of the fourth lens, and R8 is the curvature radius of the image side surface of the fourth lens. More specifically, R7 and R8 may further satisfy 0.76≤R7/R8≤1.20. By controlling the ratio of the curvature radius of the object side surface of the fourth lens to the curvature radius of the image side surface of the fourth lens, the optical path difference of the off-axis field of view can be reduced, thereby facilitating correcting the off-axis coma.

In an exemplary embodiment, the optical imaging system according to the disclosure may satisfy the conditional expression TTL/ImgH≤1.6, wherein TTL is a Total Track Length from the object side surface of the first lens to an imaging surface of the optical imaging system, and ImgH is a half of the diagonal length of an effective pixel region on the imaging surface of the optical imaging system. More specifically, TTL and ImgH may further satisfy 1.37≤TTL/ImgH≤1.60. Under the condition that the half of the diagonal length of the effective pixel region on the imaging surface is determined, by controlling the Total Track Length from the object side surface of the first lens to the imaging surface, the optical imaging system is enabled to have the features of ultra-thinness and miniaturization.

In an exemplary embodiment, the optical imaging system according to the disclosure may satisfy the conditional expression 1<f5/f−f6/f<2, wherein f5 is an effective focal length of the fifth lens, f6 is an effective focal length of the sixth lens, and f is a total effective focal length of the optical imaging system. More specifically, f5, f6, and f may further satisfy 1.12≤f5/f−f6/f≤1.82. The total effective focal length of the optical imaging system, the effective focal length of the fifth lens and the effective focal length of the sixth lens are reasonably distributed, so that light from the off-axis field of view can effectively converge after reaching the imaging surface, thereby facilitating correcting the distortion of an off-axis field of view region.

In an exemplary embodiment, the optical imaging system according to the disclosure may satisfy the conditional expression 1<f45/EPD<2.5, wherein f45 is a combined focal length of the fourth lens and the fifth lens, and EPD is an entrance pupil diameter of the optical imaging system. More specifically, f45 and the EPD may further satisfy 1.06≤f45/EPD≤2.33. The combined focal power of the fourth lens and the fifth lens is a positive focal power, and when a light beam fully fills the entrance pupil diameter of the optical imaging system, the combined positive focal power of the fourth lens and the fifth lens is used to converge the divergent light beam, so that the astigmatism in the sagittal direction can be reduced.

In an exemplary embodiment, the optical imaging system according to the disclosure may satisfy the conditional expression −1.2<R9/R11<−0.5, wherein R9 is a curvature radius of the object side surface of the fifth lens, and R11 is a curvature radius of the object side surface of the sixth lens. More specifically, R9 and R11 may further satisfy −1.04≤R9/R11≤−0.69. By reasonably controlling the curvature radius of the object side surface of the fifth lens and the curvature radius of the object side surface of the sixth lens, the object side surface of the fifth lens and the object side surface of the sixth lens bear a reasonable off-axis coma, thus the primary distortion aberrations of the two surfaces offset each other, thereby reducing system distortion.

In an exemplary embodiment, the optical imaging system according to the disclosure may satisfy the conditional expression −1<(R1+R6)/(R1−R6)<0.5, wherein R1 is a curvature radius of the object side surface of the first lens, and R6 is a curvature radius of the image side surface of the third lens. More specifically, R1 and R6 may further satisfy −0.77≤(R1+R6)/(R1−R6)≤0.45. By reasonably controlling the curvature radius of the object side surface of the first lens and the curvature radius of the image side surface of the third lens, and ensuring that both the object side surface of the first lens and the image side surface of the third lens are bent towards the diaphragm, the incident angles of main light incident onto the two lens surfaces are relatively small, and thus the two lens surfaces offset each other with a relatively small aberration amount, ensuring the tolerance stability of the optical imaging system.

In an exemplary embodiment, the optical imaging system according to the disclosure may satisfy the conditional expression 2<DT61/DT11<3, wherein DT11 is a maximum effective radius of the object side surface of the first lens, and DT61 is a maximum effective radius of the object side surface of the sixth lens. More specifically, DT11 and DT61 may further satisfy $2<DT61/DT11<2.7$, for example, $2.04 \leq DT61/DT11 \leq 2.56$. By reasonably controlling the ratio of the maximum effective radius of the object side surface of the first lens to the maximum effective radius of the object side surface of the sixth lens, assembly instability due to great misalignment between the front and back ends of the optical imaging system can be prevented, facilitating ensuring the assembly processability of the system.

In an exemplary embodiment, the optical imaging system according to the disclosure may satisfy the conditional expression $0.5<|SAG32/CT3|<1.2$, wherein SAG32 is an axial distance from an intersection point between the image side surface of the third lens and the optical axis to an effective radius vertex of the image side surface of the third lens, and CT3 is a center thickness of the third lens on the optical axis. More specifically, SAG32 and CT3 may further satisfy $0.56 \leq |SAG32/CT3| \leq 1.07$. By reasonably controlling the ratio of the axial distance from the intersection point between the image side surface of the third lens and the optical axis to the effective radius vertex of the image side surface of the third lens to the center thickness of the third lens, the axial spherical aberration and Petzval field curvature can be effectively reduced under the condition of ensuring the camera lens forming manufacturing process.

In an exemplary embodiment, the optical imaging system according to the disclosure may satisfy the conditional expression $0.5<CT3/(CT1+CT2+CT4)<1.3$, wherein CT1 is a center thickness of the first lens on the optical axis, CT2 is a center thickness of the second lens on the optical axis, CT3 is the center thickness of the third lens on the optical axis, and CT4 is a center thickness of the fourth lens on the optical axis. More specifically, CT1, CT2, CT3, and CT4 may further satisfy $0.53 \leq CT3/(CT1+CT2+CT4) \leq 1.14$. If the conditional expression $0.5<CT3/(CT1+CT2+CT4)<1.3$ is satisfied, the third lens is configured to have a suitable thickness while bearing more focal power, and the center thicknesses of the first four lenses are set to be within a reasonable processing range; at the same time, it is also beneficial to shorten the Total Track Length from the object side surface of the first lens to the imaging surface, thereby ensuring the miniaturization of the camera lens.

In an exemplary embodiment, the optical imaging system above may further include at least one diaphragm so as to improve the imaging quality of the camera lens. For example, the diaphragm may be provided between the first lens and the second lens.

Optionally, the optical imaging system above may further include an optical filter for correcting the chromatic aberration and/or a protective glass for protecting a photosensitive element located on the imaging surface.

The optical imaging system according to the embodiments of the disclosure above may employ a plurality of lenses, for example, six lenses as described above. By reasonably distributing the focal power and surface shape of each lens, the center thickness of each lens, and the axial spacing between the lenses, etc., the volume of the camera lens can be effectively reduced, the sensitivity of the camera lens is reduced and the processability of the camera lens is improved, so that the optical imaging system is more beneficial to production and processing and is applicable to portable electronic products, such as smart phones. The optical imaging system configured as above can also have performances such as ultra-thinness, wide angle, and high imaging quality.

In an embodiment of the disclosure, at least one of the lens surfaces of the lenses is an aspherical lens surface. An aspherical lens has the characteristic that the curvature thereof changes continuously from the center of the lens to the periphery of the lens. Unlike a spherical lens having a constant curvature from the center of the lens to the periphery of the lens, an aspherical lens has better curvature radius characteristics, and has advantages of ameliorating distortion aberration and astigmatic aberration. Using an aspherical lens can eliminate as much as possible the aberration occurring during imaging, thereby improving the imaging quality.

However, it should be appreciated by a person skilled in the art that the number of lenses constituting the optical imaging system may be varied without departing from the claimed technical solution of the disclosure, so as to obtain the various results and advantages described in the present description. For example, although descriptions are made by taking six lenses as examples in the embodiments, the optical imaging system is not limited to including six lenses. If desired, the optical imaging system may also include other number of lenses. Specific examples of the optical imaging system applicable to the embodiments above will be further described below with reference to the drawings.

Embodiment 1

An optical imaging system according to Embodiment 1 of the disclosure will be described below with reference to FIGS. 1 to 2D. FIG. 1 shows a schematic structure diagram of an optical imaging system according to Embodiment 1 of the disclosure.

As shown in FIG. 1, the optical imaging system according to an exemplary embodiment of the disclosure includes, sequentially from an object side to an image side along an optical axis: a first lens E1, a diaphragm STO, a second lens E2, a third lens E3, a fourth lens E4, a fifth lens E5, a sixth lens E6, an optical filter E7, and an imaging surface S15.

The first lens E1 has a negative focal power, an object side surface S1 thereof is a convex surface, and an image side surface S2 thereof is a concave surface; the second lens E2 has a positive focal power, an object side surface S3 thereof is a convex surface, and an image side surface S4 thereof is a concave surface; the third lens E3 has a positive focal power, an object side surface S5 thereof is a convex surface, and an image side surface S6 thereof is a convex surface; the fourth lens E4 has a negative focal power, an object side surface S7 thereof is a convex surface, and an image side surface thereof S8 is a concave surface; the fifth lens E5 has a positive focal power, an object side surface S9 thereof is a convex surface, and an image side surface S10 thereof is a concave surface; and the sixth lens E6 has a negative focal power, an object side surface S11 is a concave surface, and an image side surface S12 thereof is a concave surface. The optical filter E7 has an object side surface S13 and an image side surface S14. Light from an object sequentially passes through the respective surfaces S1 to S14 and is finally imaged on the imaging surface S15.

Table 1 shows the surface type, curvature radius, thickness, material and conic coefficient of each dens of the optical imaging system of Embodiment 1, wherein the units of the curvature radius and the thickness are both millimeter (mm).

TABLE 1

| Surface number | Surface type | Curvature radius | Thickness | Material Refractive index | Abbe number | Conic coefficient |
|---|---|---|---|---|---|---|
| OBJ | Spherical | Infinite | Infinite | | | |
| S1 | Aspherical | 12.8788 | 0.2000 | 1.55 | 56.1 | 99.0000 |
| S2 | Aspherical | 5.8598 | 0.0734 | | | −93.5813 |
| STO | Spherical | Infinite | 0.0626 | | | |
| S3 | Aspherical | 1.7025 | 0.3007 | 1.67 | 20.4 | 4.6647 |
| S4 | Aspherical | 1.8188 | 0.1444 | | | −14.0104 |
| S5 | Aspherical | 4.3265 | 0.7860 | 1.55 | 56.1 | −52.7936 |
| S6 | Aspherical | −4.8500 | 0.0903 | | | 22.9322 |
| S7 | Aspherical | 1.3424 | 0.2000 | 1.67 | 20.4 | −3.6806 |
| S8 | Aspherical | 1.1605 | 0.1105 | | | −11.8410 |
| S9 | Aspherical | 1.1027 | 0.4117 | 1.55 | 56.1 | −9.2675 |
| S10 | Aspherical | 18.5845 | 0.6688 | | | −99.0000 |
| S11 | Aspherical | −1.3673 | 0.2000 | 1.67 | 20.4 | −0.7634 |
| S12 | Aspherical | 5520.11 | 0.1816 | | | 99.0000 |
| S13 | Spherical | Infinite | 0.1100 | 1.52 | 64.2 | |
| S14 | Spherical | Infinite | 0.2000 | | | |
| S15 | Spherical | Infinite | | | | |

As can be determined from Table 1, the object side surface and the image side surface of any one of the first lens E1 to the sixth lens E6 are both aspherical surfaces. In the present embodiment, the surface shape x of each aspherical lens can be defined by, but is not limited to, the following aspherical formula:

$$x = \frac{ch^2}{1 + \sqrt{1 - (k+1)c^2 h^2}} + \sum A_i h^i \quad (1)$$

wherein x is a distance rise between a position of the aspherical surface at a height h along the optical axis direction and an spherical surface vertex; c is a paraxial curvature of the aspherical surface, c=1/R (i.e. the paraxial curvature c is the reciprocal of the curvature radius R in Table 1); k is a conic coefficient (given in Table 1); and Ai is an i-th-order correction coefficient of the aspherical surface. The following Table 2 shows high-order coefficients A4, A6, A8, A10, A12, A14 and A16 which can be used for the aspherical lens surfaces S1-S12 in Embodiment 1.

TABLE 2

| Surface number | A4 | A6 | A8 | A10 | A12 | A14 | A16 |
|---|---|---|---|---|---|---|---|
| S1 | −1.2617E−01 | 6.0703E−01 | −2.1056E+00 | 5.9736E+00 | −1.1628E+01 | 1.2135E+01 | −5.1670E+00 |
| S2 | −3.7673E−01 | 1.5212E+00 | −5.6510E+00 | 1.9535E+01 | −5.2010E+01 | 7.6951E+01 | −4.5849E+01 |
| S3 | −7.0740E−01 | 1.3818E+00 | −1.1145E+01 | 5.1927E+01 | −1.5583E+02 | 2.5469E+02 | −1.8562E+02 |
| S4 | 1.5853E−02 | −4.9406E−01 | 8.0023E−01 | −9.7614E−01 | 4.6040E−01 | 1.2505E−01 | −2.1828E−01 |
| S5 | 6.8831E−02 | −1.2106E−01 | 9.5677E−02 | −9.9558E−02 | 3.9301E−02 | 3.5337E−02 | −1.5806E−02 |
| S6 | −3.4238E−01 | −4.9275E−01 | 2.2647E+00 | −4.2949E+00 | 4.5002E+00 | −2.5534E+00 | 6.1417E−01 |
| S7 | −5.4097E−03 | −3.4495E−01 | 7.2665E−01 | −1.0335E+00 | 9.1252E−01 | −4.8247E−01 | 1.0964E−01 |
| S8 | 2.5571E−01 | −6.4221E−01 | 8.2230E−01 | −6.6017E−01 | 3.1744E−01 | −8.1644E−02 | 8.6015E−03 |
| S9 | 1.8013E−02 | −1.3331E−01 | 2.3387E−01 | −3.0422E−01 | 2.0985E−01 | −6.8887E−02 | 8.6632E−03 |
| S10 | 8.1028E−02 | 1.1525E−02 | −5.2889E−02 | −1.6422E−02 | 4.1562E−02 | −1.9083E−02 | 2.8958E−03 |
| S11 | 1.5953E−01 | −3.0376E−01 | 3.1484E−01 | −1.4808E−01 | 3.4913E−02 | −4.3870E−03 | 3.0105E−04 |
| S12 | 1.3303E−01 | −2.7071E−01 | 2.2421E−01 | −1.0684E−01 | 2.9534E−02 | −4.3368E−03 | 2.5840E−04 |

Table 3 shows the effective focal lengths f1 to f6 of the lenses in Embodiment 1, the total effective focal length f of the optical imaging system, the distance TTL on the optical axis from the object side surface S1 of the first lens E1 to the imaging surface S15, and the maximum half field of view (HFOV).

TABLE 3

| | |
|---|---|
| f1 (mm) | −20.00 |
| f2 (mm) | 20.00 |
| f3 (mm) | 4.34 |
| f4 (mm) | −23.12 |
| f5 (mm) | 2.14 |
| f6 (mm) | −2.08 |
| f (mm) | 2.32 |
| TTL (mm) | 3.74 |
| HFOV (°) | 52.0 |

Figure 2A:
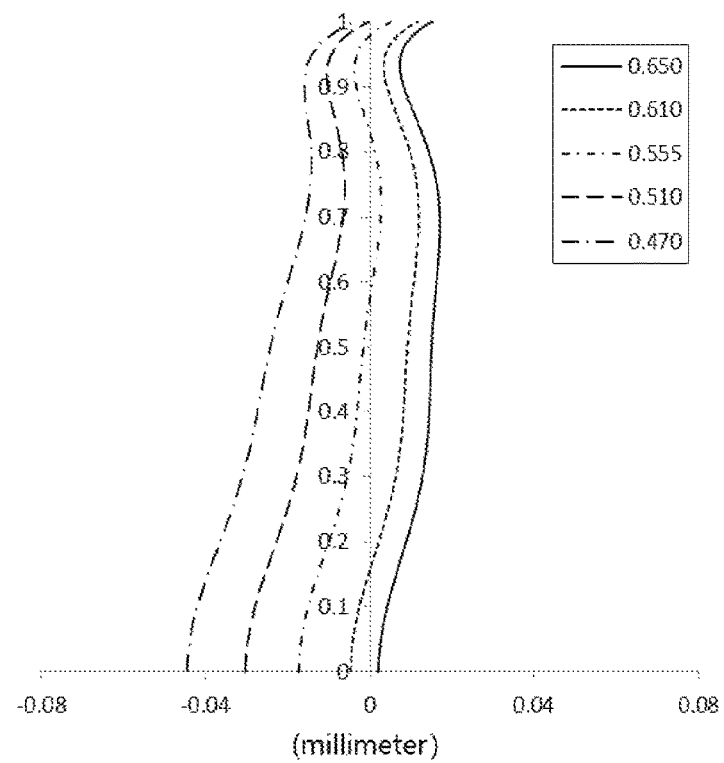
FIGS. 2A to 2D respectively show a longitudinal aberration curve, an astigmatism curve, a distortion curve, and a lateral color curve of the optical imaging system of Embodiment 1.
Figure 2B:
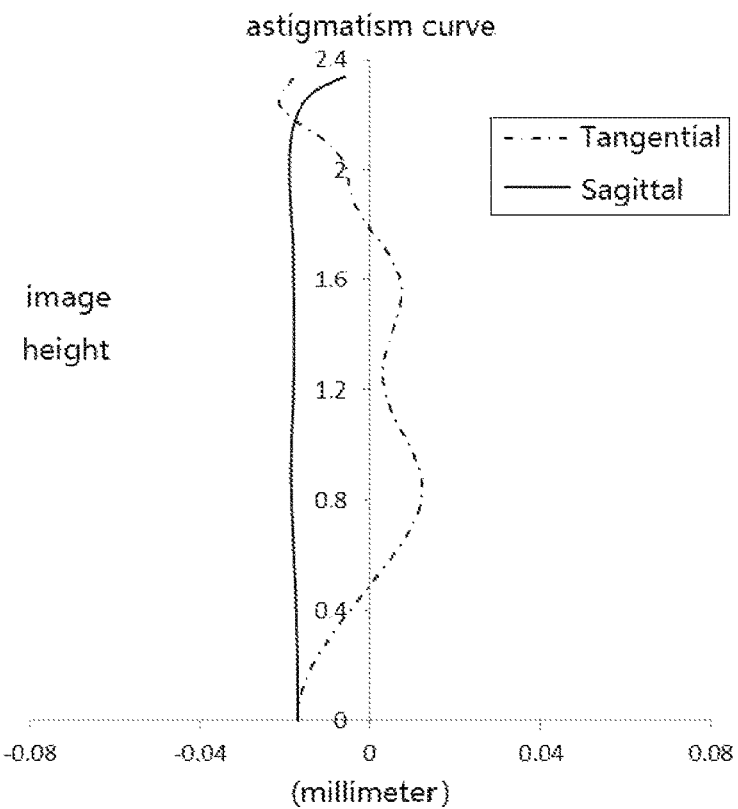
Figure 2C:
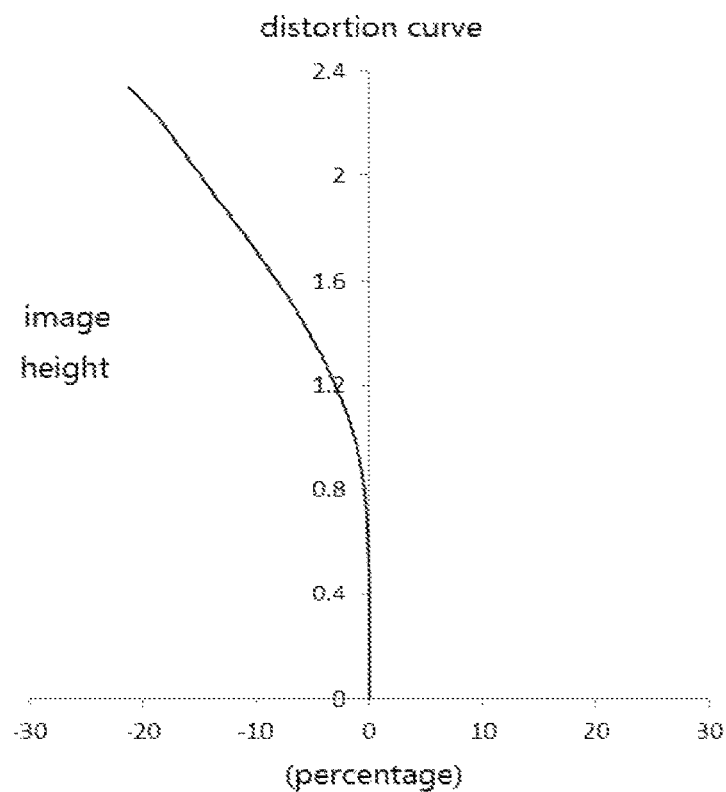
Figure 2D:
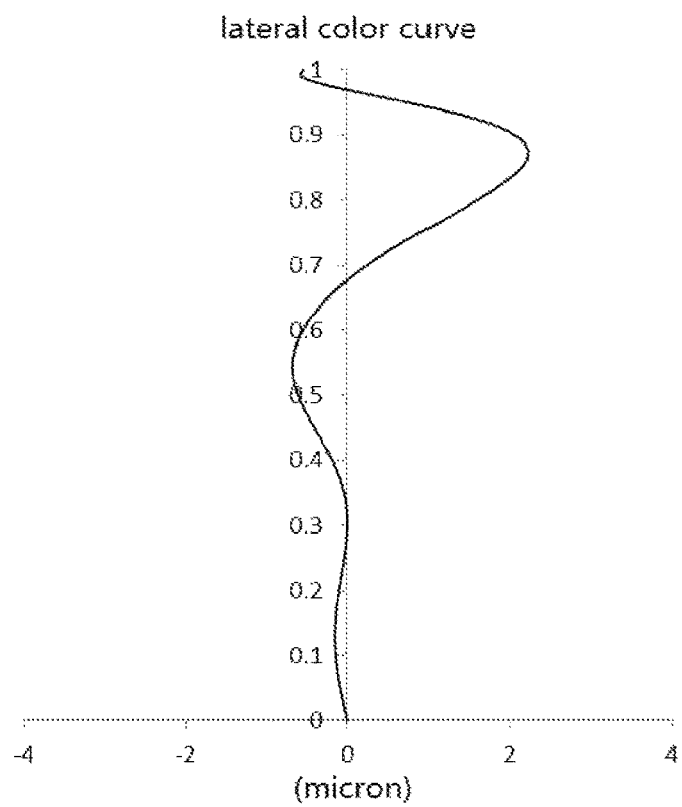

FIG. 2A shows a longitudinal aberration curve of the optical imaging system of Embodiment 1, which represents deviations of convergence focal points after light of different wavelengths passes through the system. FIG. 2B shows an astigmatism curve of the optical imaging system of Embodiment 1, which represents a meridional field curvature and a sagittal field curvature. FIG. 2C shows a distortion curve of the optical imaging system of Embodiment 1, which represents distortion values at different image heights. FIG. 2D shows a lateral color curve of the optical imaging system of Embodiment 1, which represents deviations of different image heights on the imaging surface after light passes through the system. From FIGS. 2A to 2D, it can be determined that the optical imaging system provided in Embodiment 1 can achieve a good imaging quality.

Embodiment 2

Figure 3:
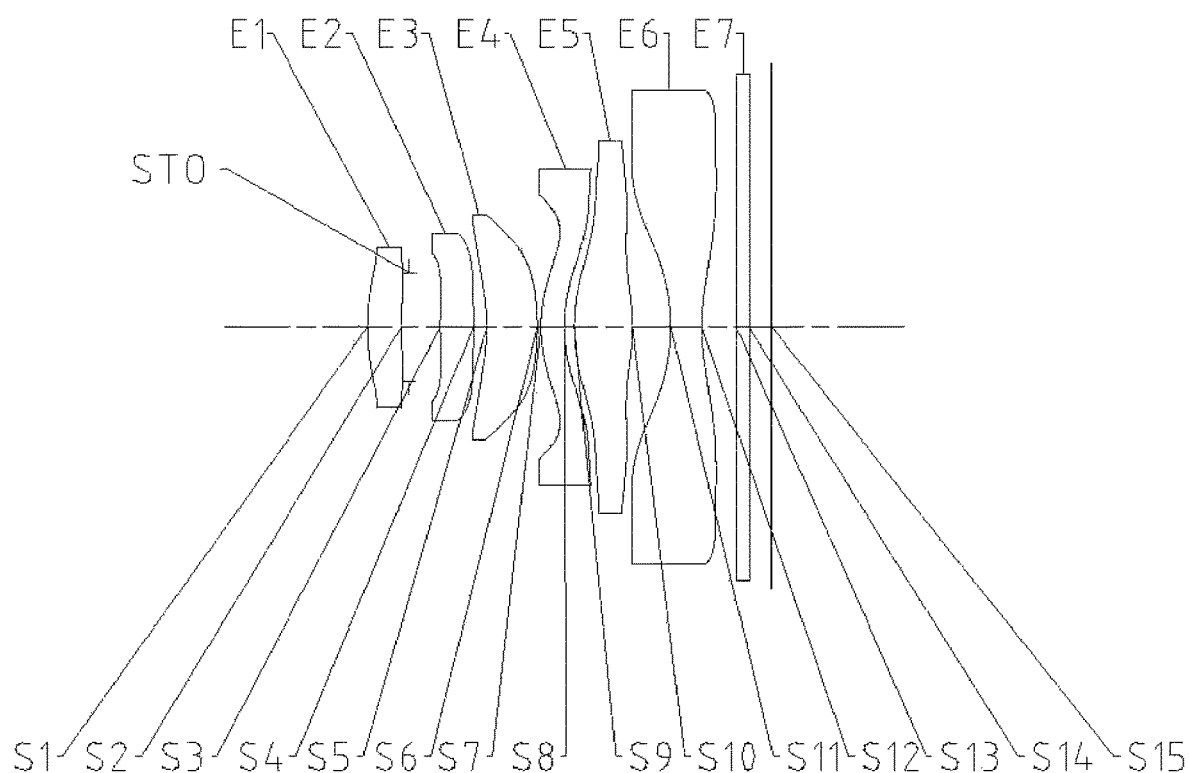
FIG. 3 shows a schematic structure diagram of an optical imaging system according to Embodiment 2 of the disclosure.

An optical imaging system according to Embodiment 2 of the disclosure will be described below with reference to FIGS. 3 to 4D. In the present embodiment and the following examples, for brevity, some descriptions similar to that in Embodiment 1 are omitted. FIG. 3 shows a schematic structure diagram of an optical imaging system according to Embodiment 2 of the disclosure.

As shown in FIG. 3, the optical imaging system according to an exemplary embodiment of the disclosure includes, sequentially from an object side to an image side along an optical axis: a first lens E1, a diaphragm STO, a second lens E2, a third lens E3, a fourth lens E4, a fifth lens E5, a sixth lens E6, an optical filter E7, and an imaging surface S15.

The first lens E1 has a positive focal power, an object side surface S1 thereof is a convex surface, and an image side surface S2 thereof is a concave surface; the second lens E2 has a positive focal power, an object side surface S3 thereof is a convex surface, and an image side surface S4 thereof is a convex surface; the third lens E3 has a negative focal power, an object side surface S5 thereof is a concave surface, and an image side surface S6 thereof is a convex surface; the fourth lens E4 has a positive focal power, an object side surface S7 thereof is a convex surface, and an image side surface S8 thereof is a concave surface; the fifth lens E5 has a positive focal power, an object side surface S9 thereof is a convex surface, and an image side surface S10 thereof is a convex surface; and the sixth lens E6 has a negative focal power, an object side surface S11 is a concave surface, and an image side surface S12 thereof is a concave surface. The optical filter E7 has an object side surface S13 and an image side surface S14. Light from an object sequentially passes through the respective surfaces S1 to S14 and is finally imaged on the imaging surface S15.

Table 4 shows the surface type, curvature radius, thickness, material and conic coefficient of each lens of the optical imaging system of Embodiment 2, wherein the units of the curvature radius and the thickness are both millimeter (mm). Table 5 shows high-order coefficients which can be used for the aspherical lens surfaces in Embodiment 2, wherein the surface shape of the aspherical surfaces can be defined by formula (1) given in Embodiment 1 above. Table 6 shows the effective focal lengths f1 to f6 of the lenses in Embodiment 2, the total effective focal length f of the optical imaging system, the distance TTL on the optical axis from the object side surface S1 of the first lens E1 to the imaging surface S15, and the maximum half field of view (HFOV).

TABLE 4

| Surface number | Surface type | Curvature radius | Thickness | Material Refractive index | Abbe number | Conic coefficient |
|---|---|---|---|---|---|---|
| OBJ | Spherical | Infinite | Infinite | | | |
| S1 | Aspherical | 2.0823 | 0.2981 | 1.55 | 56.1 | −10.4493 |
| S2 | Aspherical | 5.6239 | 0.0706 | | | −99.0000 |
| STO | Spherical | Infinite | 0.2677 | | | |
| S3 | Aspherical | 7.2123 | 0.2933 | 1.67 | 20.4 | −0.5624 |
| S4 | Aspherical | −9.5165 | 0.1192 | | | 65.4470 |
| S5 | Aspherical | −1.5919 | 0.4399 | 1.55 | 56.1 | −25.1440 |
| S6 | Aspherical | −2.4559 | 0.0300 | | | −32.7718 |
| S7 | Aspherical | 1.4374 | 0.2040 | 1.67 | 20.4 | −3.0806 |
| S8 | Aspherical | 1.4354 | 0.0883 | | | −9.4215 |
| S9 | Aspherical | 1.6180 | 0.5135 | 1.55 | 56.1 | −7.1557 |
| S10 | Aspherical | −1.9134 | 0.3365 | | | −12.0124 |
| S11 | Aspherical | −1.7686 | 0.2700 | 1.67 | 20.4 | −0.7021 |
| S12 | Aspherical | 2.0580 | 0.3029 | | | −16.1877 |
| S13 | Spherical | Infinite | 0.1100 | 1.52 | 64.2 | |
| S14 | Spherical | Infinite | 0.2000 | | | |
| S15 | Spherical | Infinite | | | | |

TABLE 5

| Surface number | A4 | A6 | A8 | A10 | A12 | A14 | A16 |
|---|---|---|---|---|---|---|---|
| S1 | 3.0623E−02 | 1.8366E−01 | −2.4103E+00 | 7.6825E+00 | −1.3032E+01 | 9.4072E+00 | −1.5446E+00 |
| S2 | −6.1944E−02 | −5.1532E−01 | 2.8843E+00 | −1.8654E+01 | 6.7284E+01 | −1.2998E+02 | 1.0479E+02 |
| S3 | −1.5200E−01 | −5.6596E−01 | −6.2384E−02 | 4.5048E−01 | −1.2228E+00 | −6.0525E+00 | 9.3388E+00 |
| S4 | 2.6004E−01 | −1.2506E+00 | 2.8670E+00 | −6.2705E+00 | 8.3561E+00 | −5.7816E+00 | 1.5433E+00 |
| S5 | 4.8665E−03 | 2.9329E−01 | −7.8427E−01 | 2.5018E−01 | 1.3071E+00 | −1.6002E+00 | 5.4293E−01 |
| S6 | −2.1610E−01 | −7.7575E−01 | 2.2491E+00 | −3.8790E+00 | 3.9732E+00 | −2.0852E+00 | 4.3494E−01 |
| S7 | −1.1173E−01 | 3.5859E−01 | −9.8671E−01 | 1.1950E+00 | −9.5226E−01 | 4.3154E−01 | −7.7555E−02 |
| S8 | 5.5848E−02 | 1.7865E−01 | −6.7210E−01 | 6.9638E−01 | −3.3941E−01 | 8.1195E−02 | −7.6889E−03 |
| S9 | 2.1253E−02 | −1.0891E−01 | 3.8165E−02 | 1.8105E−02 | −1.4278E−01 | 3.2241E−03 | −2.5004E−04 |
| S10 | 2.1813E−01 | −1.1880E−02 | −1.9359E−01 | 1.5810E−01 | −5.5888E−02 | 9.5193E−03 | −6.3669E−04 |
| S11 | 3.9838E−02 | −5.2845E−02 | 1.0695E−01 | −6.6528E−02 | 1.9962E−02 | −3.0399E−03 | 1.8972E−04 |
| S12 | −6.9836E−02 | 4.3546E−02 | −2.8214E−02 | 1.3199E−02 | −3.4809E−03 | 4.7068E−04 | −2.6007E−05 |

TABLE 6

| | |
|---|---|
| f1 (mm) | 5.91 |
| f2 (mm) | 6.29 |
| f3 (mm) | −10.15 |
| f4 (mm) | 39.79 |
| f5 (mm) | 1.70 |
| f6 (mm) | −1.41 |

TABLE 6-continued

| | |
|---|---|
| f (mm) | 2.33 |
| TTL (mm) | 3.54 |
| HFOV (°) | 51.0 |

Figure 4A:
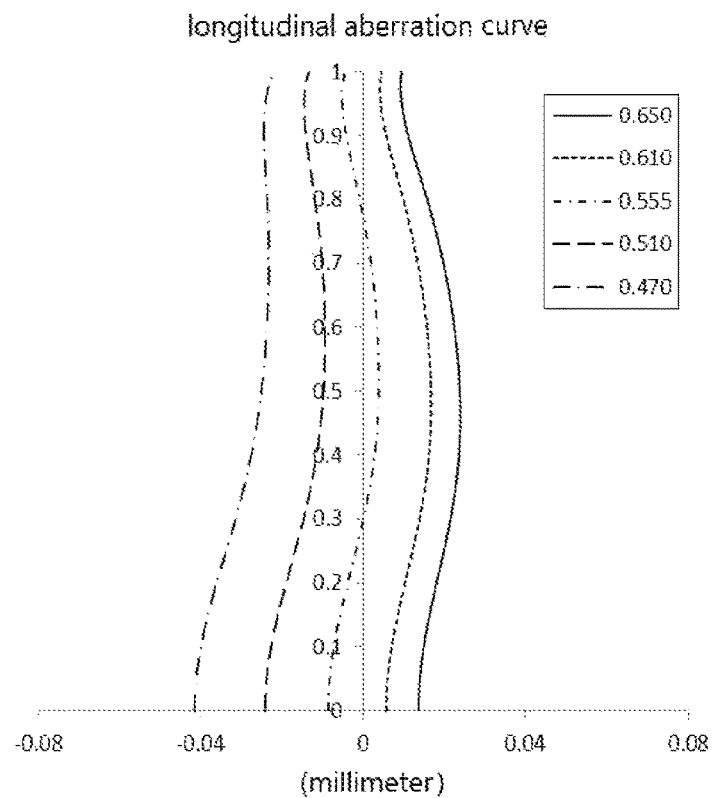
FIGS. 4A to 4D respectively show a longitudinal aberration curve, an astigmatism curve, a distortion curve, and a lateral color curve of the optical imaging system of Embodiment 2.
Figure 4B:
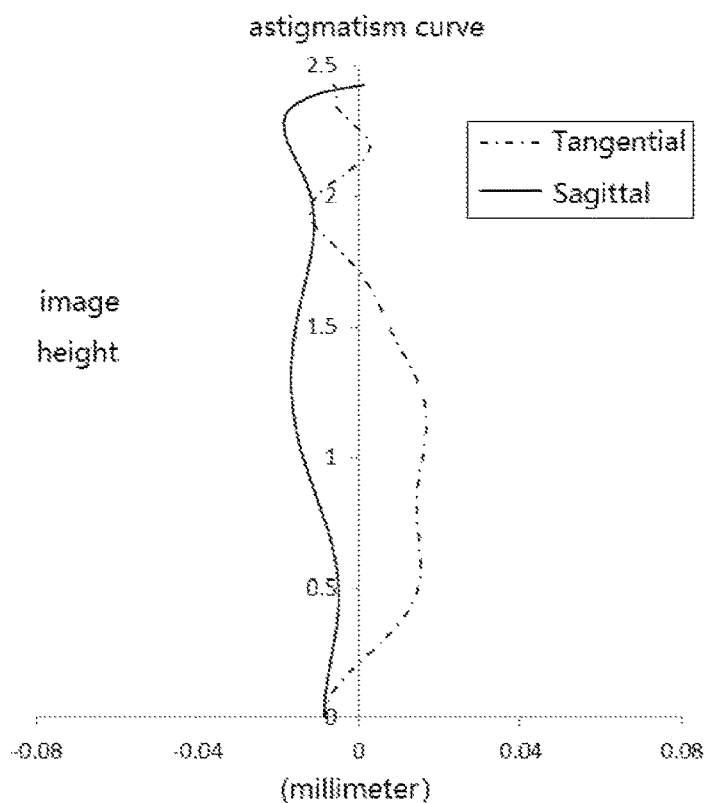
Figure 4C:
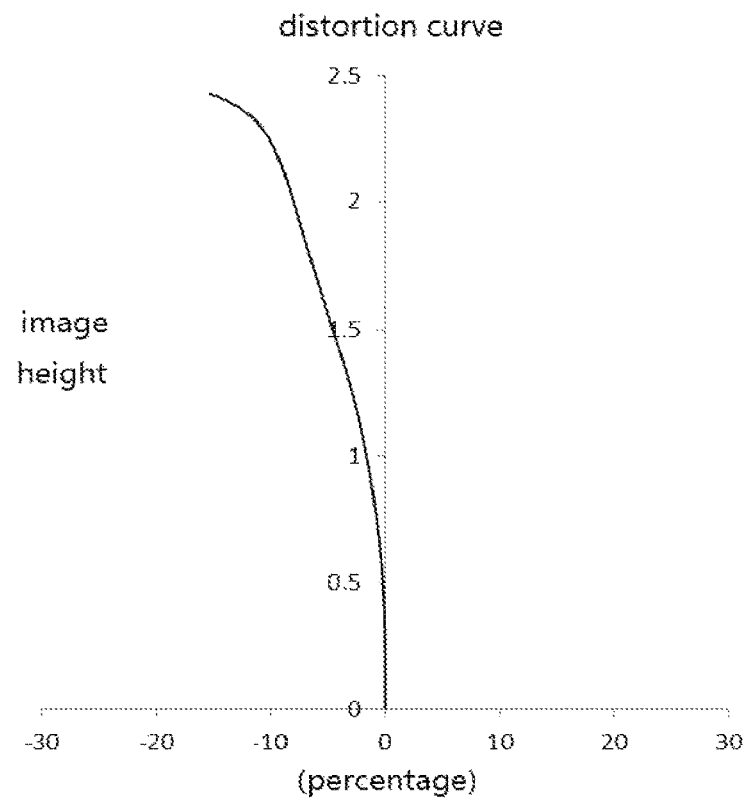
Figure 4D:
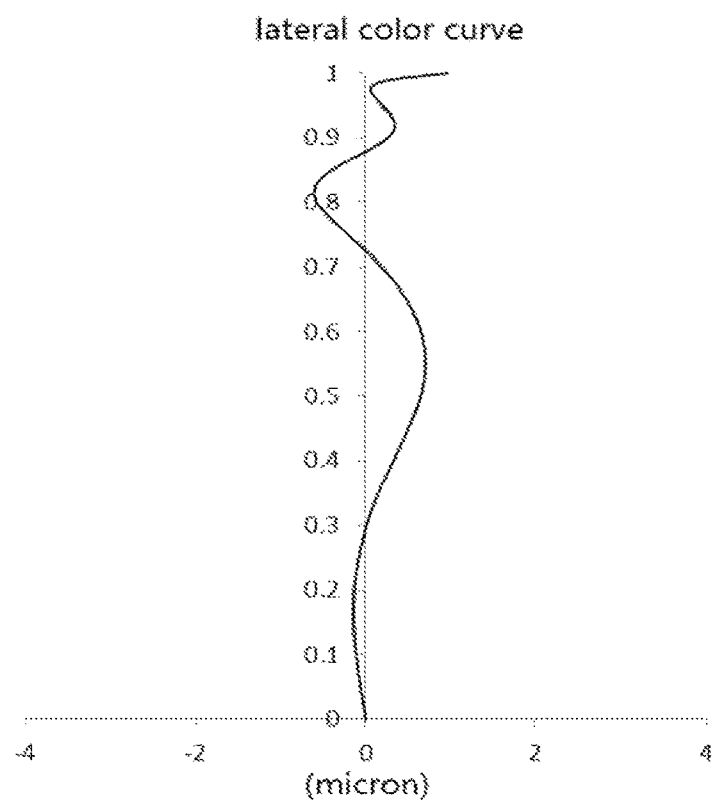

FIG. 4A shows a longitudinal aberration curve of the optical imaging system of Embodiment 2, which represents deviations of convergence focal points after light of different wavelengths passes through the system. FIG. 4B shows an astigmatism curve of the optical imaging system of Embodiment 2, which represents a meridional field curvature and a sagittal field curvature. FIG. 4C shows a distortion curve of the optical imaging system of Embodiment 2, which represents distortion values at different image heights. FIG. 4D shows a lateral color curve of the optical imaging system of Embodiment 2, which represents deviations of different image heights on the imaging surface after light passes through the system. From FIGS. 4A to 4D, it can be determined that the optical imaging system provided in Embodiment 2 can achieve a good imaging quality.

Embodiment 3

Figure 5:
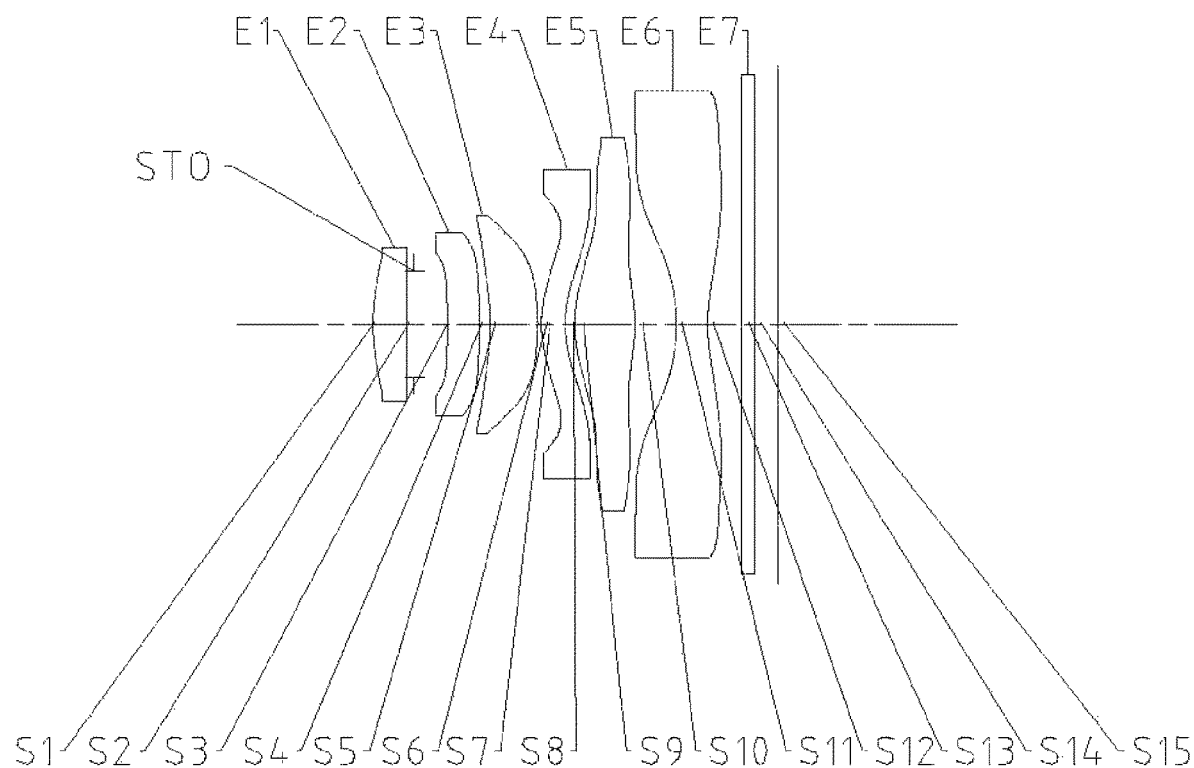
FIG. 5 shows a schematic structure diagram of an optical imaging system according to Embodiment 3 of the disclosure.

An optical imaging system according to Embodiment 3 of the disclosure will be described below with reference to FIGS. 5 to 6D. FIG. 5 shows a schematic structure diagram of an optical imaging system according to Embodiment 3 of the disclosure.

As shown in FIG. 5, the optical imaging system according to an exemplary embodiment of the disclosure includes, sequentially from an object side to an image side along an optical axis: a first lens E1, a diaphragm STO, a second lens E2, a third lens E3, a fourth lens E4, a fifth lens E5, a sixth lens E6, an optical filter E7, and an imaging surface S15.

The first lens E1 has a positive focal power, an object side surface S1 thereof is a convex surface, and an image side surface S2 thereof is a concave surface; the second lens E2 has a positive focal power, an object side surface S3 thereof is a concave surface, and an image side surface S4 thereof is a convex surface; the third lens E3 has a negative focal power, an object side surface S5 thereof is a concave surface, and an image side surface S6 thereof is a convex surface; the fourth lens E4 has a negative focal power, an object side surface S7 thereof is a convex surface, and an image side surface thereof S8 is a concave surface; the fifth lens E5 has a positive focal power, an object side surface S9 thereof is a convex surface, and an image side surface S10 thereof is a convex surface; and the sixth lens E6 has a negative focal power, an object side surface S11 is a concave surface, and an image side surface S12 thereof is a concave surface. The optical filter E7 has an object side surface S13 and an image side surface S14. Light from an object sequentially passes through the respective surfaces S1 to S14 and is finally imaged on the imaging surface S15.

Table 7 shows the surface type, curvature radius, thickness, material and conic coefficient of each lens of the optical imaging system of Embodiment 3, wherein the units of the curvature radius and the thickness are both millimeter (mm). Table 8 shows high-order coefficients which can be used for the aspherical lens surfaces in Embodiment 3, wherein the surface shape of the aspherical surfaces can be defined by formula (1) given in Embodiment 1 above. Table 9 shows the effective focal lengths f1 to f6 of the lenses in Embodiment 3, the total effective focal length f of the optical imaging system, the distance TTL on the optical axis from the object side surface S1 of the first lens E1 to the imaging surface S15, and the maximum half field of view (HFOV).

TABLE 7

| Surface number | Surface type | Curvature radius | Thickness | Material Refractive index | Abbe number | Conic coefficient |
|---|---|---|---|---|---|---|
| OBJ | Spherical | Infinite | Infinite | | | |
| S1 | Aspherical | 2.0677 | 0.2866 | 1.55 | 56.1 | −9.9890 |
| S2 | Aspherical | 7.9335 | 0.0664 | | | −96.3795 |
| STO | Spherical | Infinite | 0.2866 | | | |
| S3 | Aspherical | −62.5406 | 0.2773 | 1.67 | 20.4 | 99.0000 |
| S4 | Aspherical | −6.3693 | 0.0979 | | | 46.0215 |
| S5 | Aspherical | −1.7663 | 0.4072 | 1.55 | 56.1 | −23.5276 |
| S6 | Aspherical | −2.6274 | 0.0300 | | | −33.6588 |
| S7 | Aspherical | 1.3667 | 0.2058 | 1.67 | 20.4 | −3.2515 |
| S8 | Aspherical | 1.1524 | 0.0784 | | | −10.7312 |
| S9 | Aspherical | 1.2431 | 0.5274 | 1.55 | 56.1 | −8.3564 |
| S10 | Aspherical | −1.8514 | 0.3572 | | | −12.5738 |
| S11 | Aspherical | −1.7603 | 0.2700 | 1.67 | 20.4 | −0.6761 |
| S12 | Aspherical | 1.9861 | 0.2932 | | | −14.1083 |
| S13 | Spherical | Infinite | 0.1100 | 1.52 | 64.2 | |
| S14 | Spherical | Infinite | 0.2000 | | | |
| S15 | Spherical | Infinite | | | | |

TABLE 8

| Surface number | A4 | A6 | A8 | A10 | A12 | A14 | A16 |
|---|---|---|---|---|---|---|---|
| S1 | 7.2344E−04 | 7.2211E−01 | −6.2571E+00 | 2.3515E+01 | −4.9614E+01 | 5.2703E+01 | −2.1874E+01 |
| S2 | −9.8395E−02 | −1.3920E−01 | −5.0758E−01 | 3.3758E+00 | −1.4689E+01 | 2.5762E+01 | −1.1719E+01 |
| S3 | −1.7804E−01 | −1.0311E+00 | 3.0479E+00 | −1.0004E+01 | 1.4780E+01 | −1.4528E+01 | 8.5925E+00 |
| S4 | 2.2398E−01 | −1.2936E+00 | 3.5943E+00 | −7.5759E+00 | 9.1945E+00 | −6.0159E+00 | 1.6234E+00 |

TABLE 8-continued

| Surface number | A4 | A6 | A8 | A10 | A12 | A14 | A16 |
|---|---|---|---|---|---|---|---|
| S5 | 1.6836E−01 | −7.0946E−01 | 2.6249E+00 | −5.8877E+00 | 7.1809E+00 | −4.4810E+00 | 1.1193E+00 |
| S6 | −1.4090E−01 | −1.4191E+00 | 3.8096E+00 | −5.8195E+00 | 5.2478E+00 | −2.4556E+00 | 4.6023E−01 |
| S7 | −9.6437E−02 | 1.9232E−01 | −5.9586E−01 | 7.2142E−01 | −5.9285E−01 | 2.7617E−01 | −4.9850E−02 |
| S8 | 7.1163E−02 | 4.2607E−02 | −4.1452E−01 | 4.6658E−01 | −2.3229E−01 | 5.6219E−02 | −5.4019E−03 |
| S9 | −1.2725E−02 | −3.6653E−02 | −3.9267E−02 | 6.1957E−02 | −2.7847E−02 | 5.4839E−03 | −4.1150E−04 |
| S10 | 2.0143E−01 | 5.8225E−02 | −2.7972E−01 | 2.1490E−01 | −7.7493E−02 | 1.3837E−02 | −9.8169E−04 |
| S11 | 7.1070E−03 | −7.0829E−04 | 7.9092E−02 | −6.2955E−02 | 2.1767E−02 | −3.6999E−03 | 2.5192E−04 |
| S12 | −1.0211E−01 | 7.6713E−02 | −4.7752E−02 | 2.0215E−02 | −5.0315E−03 | 6.6684E−04 | −3.6832E−05 |

TABLE 9

| | |
|---|---|
| f1 (mm) | 5.06 |
| f2 (mm) | 10.77 |
| f3 (mm) | −11.91 |
| f4 (mm) | −18.06 |
| f5 (mm) | 1.46 |
| f6 (mm) | −1.38 |
| f (mm) | 2.29 |
| TTL (mm) | 3.49 |
| HFOV (°) | 51.0 |

Figure 6A:
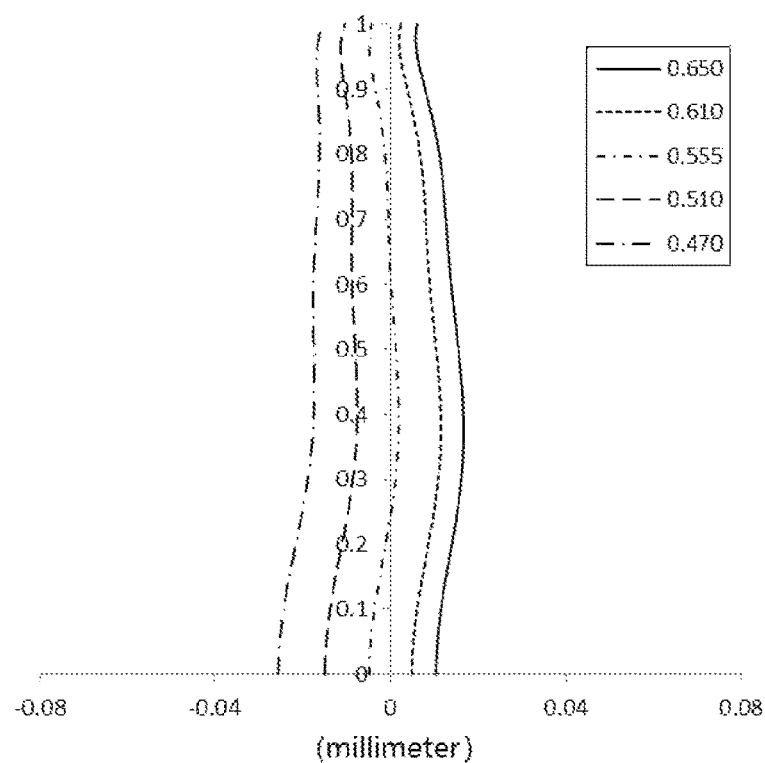
FIGS. 6A to 6D respectively show a longitudinal aberration curve, an astigmatism curve, a distortion curve, and a lateral color curve of the optical imaging system of Embodiment 3.
Figure 6B:
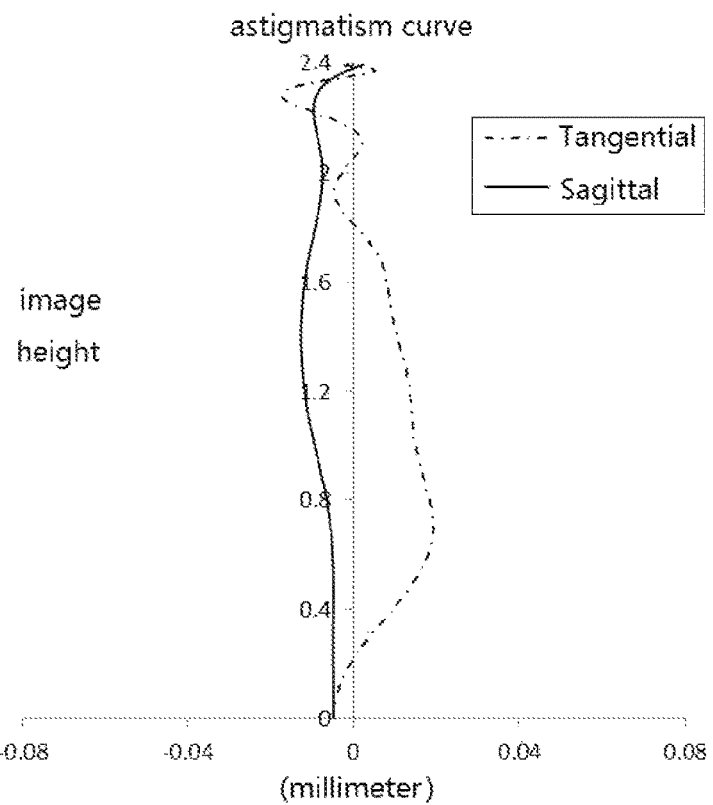
Figure 6C:
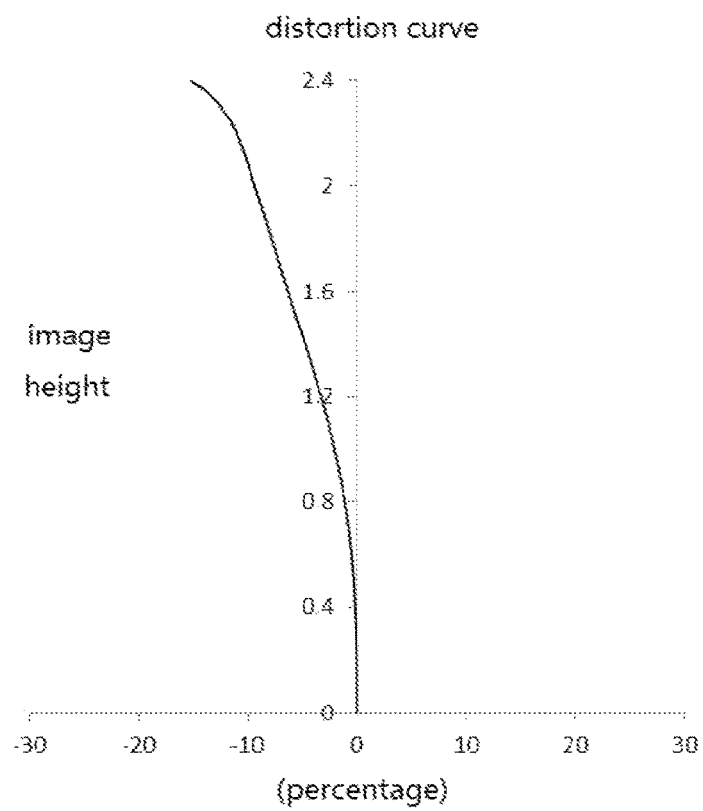
Figure 6D:
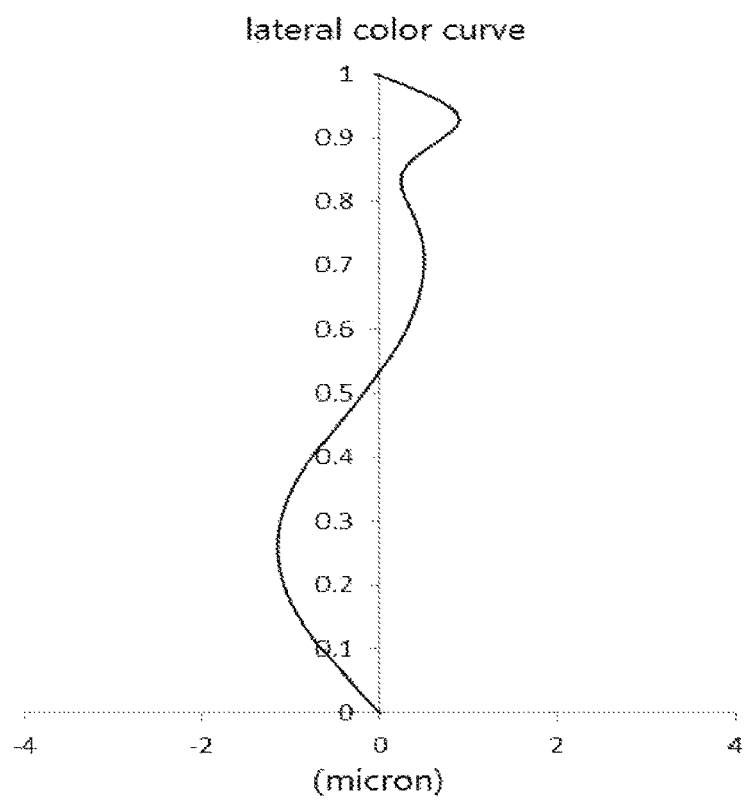

FIG. 6A shows a longitudinal aberration curve of the optical imaging system of Embodiment 3, which represents deviations of convergence focal points after light of different wavelengths passes through the system. FIG. 6B shows an astigmatism curve of the optical imaging system of Embodiment 3, which represents a meridional field curvature and a sagittal field curvature. FIG. 6C shows a distortion curve of the optical imaging system of Embodiment 3, which represents distortion values at different image heights. FIG. 6D shows a lateral color curve of the optical imaging system of Embodiment 3, which represents deviations of different image heights on the imaging surface after light passes through the system. From FIGS. 6A to 6D, it can be determined that the optical imaging system provided in Embodiment 3 can achieve a good imaging quality.

Embodiment 4

Figure 7:
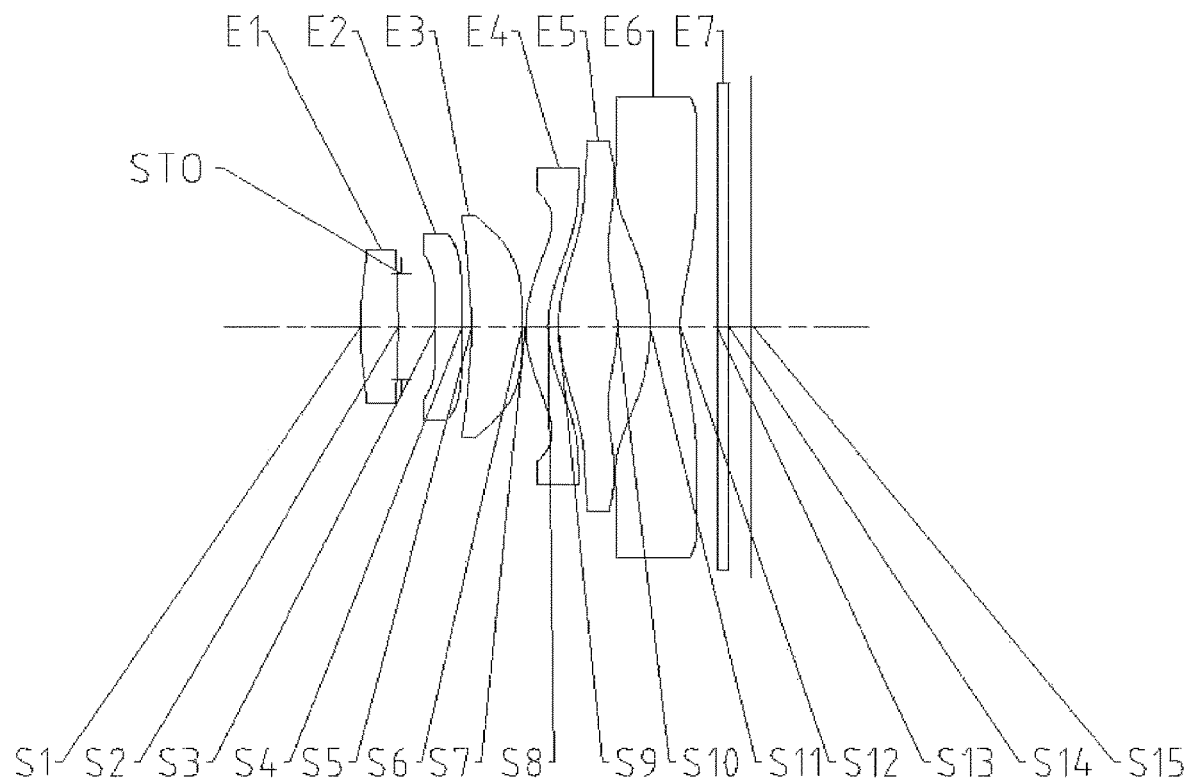
FIG. 7 shows a schematic structure diagram of an optical imaging system according to Embodiment 4 of the disclosure.

An optical imaging system according to Embodiment 4 of the disclosure will be described below with reference to FIGS. 7 to 8D. FIG. 7 shows a schematic structure diagram of an optical imaging system according to Embodiment 4 of the disclosure.

As shown in FIG. 7, the optical imaging system according to an exemplary embodiment of the disclosure includes, sequentially from an object side to an image side along an optical axis: a first lens E1, a diaphragm STO, a second lens E2, a third lens E3, a fourth lens E4, a fifth lens E5, a sixth lens E6, an optical filter E7, and an imaging surface S15.

The first lens E1 has a positive focal power, an object side surface S1 thereof is a convex surface, and an image side surface S2 thereof is a convex surface; the second lens E2 has a positive focal power, an object side surface S3 thereof is a concave surface, and an image side surface S4 thereof is a convex surface; the third lens E3 has a negative focal power, an object side surface S5 thereof is a concave surface, and an image side surface S6 thereof is a convex surface; the fourth lens E4 has a positive focal power, an object side surface S7 thereof is a convex surface, and an image side surface S8 thereof is a concave surface; the fifth lens E5 has a positive focal power, an object side surface S9 thereof is a convex surface, and an image side surface S10 thereof is a convex surface; and the sixth lens E6 has a negative focal power, an object side surface S11 is a concave surface, and an image side surface S12 thereof is a concave surface. The optical filter E7 has an object side surface S13 and an image side surface S14. Light from an object sequentially passes through the respective surfaces S1 to S14 and is finally imaged on the imaging surface S15.

Table 10 shows the surface type, curvature radius, thickness, material and conic coefficient of each lens of the optical imaging system of Embodiment 4, wherein the units of the curvature radius and the thickness are both millimeter (mm). Table 11 shows high-order coefficients which can be used for the aspherical lens surfaces in Embodiment 4, wherein the surface shape of the aspherical surfaces can be defined by formula (1) given in Embodiment 1 above. Table 12 shows the effective focal lengths f1 to f6 of the lenses in Embodiment 4, the total effective focal length f of the optical imaging system, the distance TTL on the optical axis from the object side surface S1 of the first lens E1 to the imaging surface S15, and the maximum half field of view (HFOV).

TABLE 10

| Surface number | Surface type | Curvature radius | Thickness | Material Refractive index | Abbe number | Conic coefficient |
|---|---|---|---|---|---|---|
| OBJ | Spherical | Infinite | Infinite | | | |
| S1 | Aspherical | 2.7001 | 0.3379 | 1.55 | 56.1 | −15.4507 |
| S2 | Aspherical | −569.142 | 0.0300 | | | −99.0000 |
| STO | Spherical | Infinite | 0.3061 | | | |
| S3 | Aspherical | −31.5246 | 0.2369 | 1.67 | 20.4 | 99.0000 |
| S4 | Aspherical | −9.0128 | 0.0860 | | | 49.8145 |
| S5 | Aspherical | −2.1441 | 0.4531 | 1.55 | 56.1 | −32.1120 |
| S6 | Aspherical | −5.9297 | 0.0300 | | | −28.9010 |
| S7 | Aspherical | 1.0519 | 0.2006 | 1.67 | 20.4 | −3.1399 |
| S8 | Aspherical | 1.0365 | 0.0927 | | | −7.7765 |
| S9 | Aspherical | 1.2800 | 0.5372 | 1.55 | 56.1 | −7.5184 |
| S10 | Aspherical | −1.2600 | 0.2910 | | | −9.8692 |

TABLE 10-continued

| Surface number | Surface type | Curvature radius | Thickness | Material Refractive index | Abbe number | Conic coefficient |
|---|---|---|---|---|---|---|
| S11 | Aspherical | −1.8476 | 0.2700 | 1.67 | 20.4 | −0.6194 |
| S12 | Aspherical | 1.4410 | 0.3294 | | | −10.1528 |
| S13 | Spherical | Infinite | 0.1100 | 1.52 | 64.2 | |
| S14 | Spherical | Infinite | 0.2000 | | | |
| S15 | Spherical | Infinite | | | | |

TABLE 11

| Surface number | A4 | A6 | A8 | A10 | A12 | A14 | A16 |
|---|---|---|---|---|---|---|---|
| S1 | −4.5222E−02 | 5.8895E−01 | −5.4892E+00 | 2.2063E+01 | −5.0131E+01 | 5.8439E+01 | −2.7247E+01 |
| S2 | −1.4757E−01 | −1.4784E−01 | −1.3964E+00 | 1.5470E+01 | −7.4799E+01 | 1.6527E+02 | −1.3412E+02 |
| S3 | −1.7502E−01 | −1.3980E+00 | 3.0914E+00 | −6.1930E−01 | −2.3429E+01 | 4.5334E+01 | −2.4241E+01 |
| S4 | 5.0602E−01 | −3.3946E+00 | 1.0163E+01 | −1.9259E+01 | 2.1784E+01 | −1.4117E+01 | 4.0231E+00 |
| S5 | 6.2172E−01 | −3.0044E+00 | 8.0269E+00 | −1.2808E+01 | 1.2014E+01 | −6.1666E+00 | 1.3434E+00 |
| S6 | −8.8933E−02 | −1.6253E+00 | 4.0358E+00 | −5.8237E+00 | 4.9716E+00 | −2.1880E+00 | 3.8206E−01 |
| S7 | −7.8213E−02 | 1.1589E−01 | −3.7879E−01 | 4.9354E−01 | −4.2930E−01 | 1.9376E−01 | −3.2348E−02 |
| S8 | 1.6839E−01 | −3.3845E−01 | 2.2705E−01 | −8.5389E−02 | 2.1960E−02 | −3.5596E−03 | 2.2265E−04 |
| S9 | −1.5910E−03 | 1.3051E−02 | −8.3911E−02 | 6.1552E−02 | −1.6964E−02 | 1.7481E−03 | −2.7508E−05 |
| S10 | 8.3846E−02 | 5.6544E−01 | −9.4794E−01 | 6.6180E−01 | −2.4116E−01 | 4.4877E−02 | −3.3546E−03 |
| S11 | 7.9373E−02 | −2.8099E−01 | 4.3158E−01 | −2.7172E−01 | 8.6674E−02 | −1.4008E−02 | 9.1330E−04 |
| S12 | −1.0918E−01 | 4.7796E−02 | −1.1326E−02 | 2.2610E−03 | −5.5911E−04 | 1.1430E−04 | −1.0682E−05 |

TABLE 12

| | |
|---|---|
| f1 (mm) | 4.95 |
| f2 (mm) | 19.12 |
| f3 (mm) | −6.46 |
| f4 (mm) | 25.83 |
| f5 (mm) | 1.26 |
| f6 (mm) | −1.19 |
| f (mm) | 2.20 |
| TTL (mm) | 3.51 |
| HFOV (°) | 51.0 |

Figure 8A:
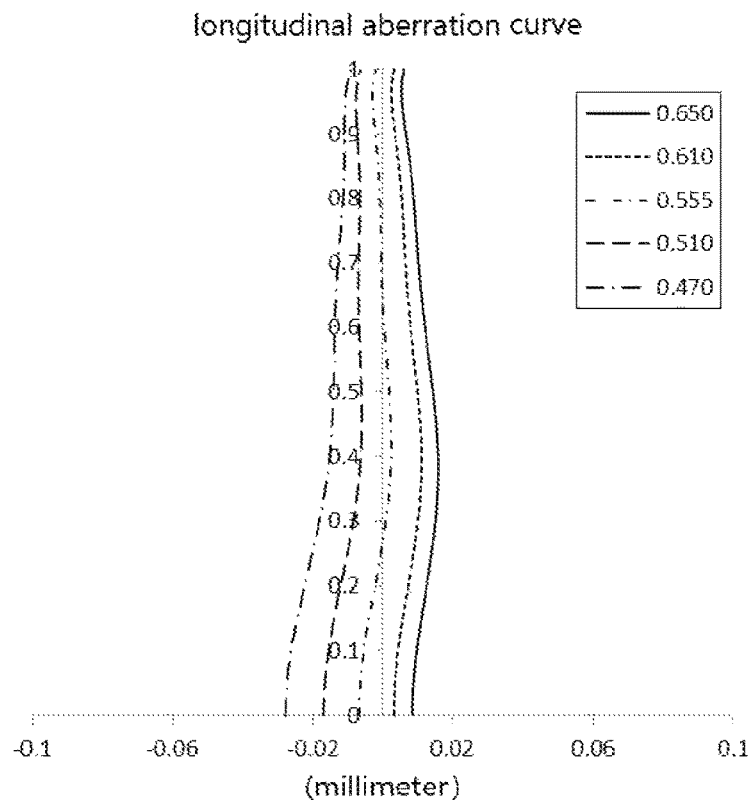
FIGS. 8A to 8D respectively show a longitudinal aberration curve, an astigmatism curve, a distortion curve, and a lateral color curve of the optical imaging system of Embodiment 4.
Figure 8B:
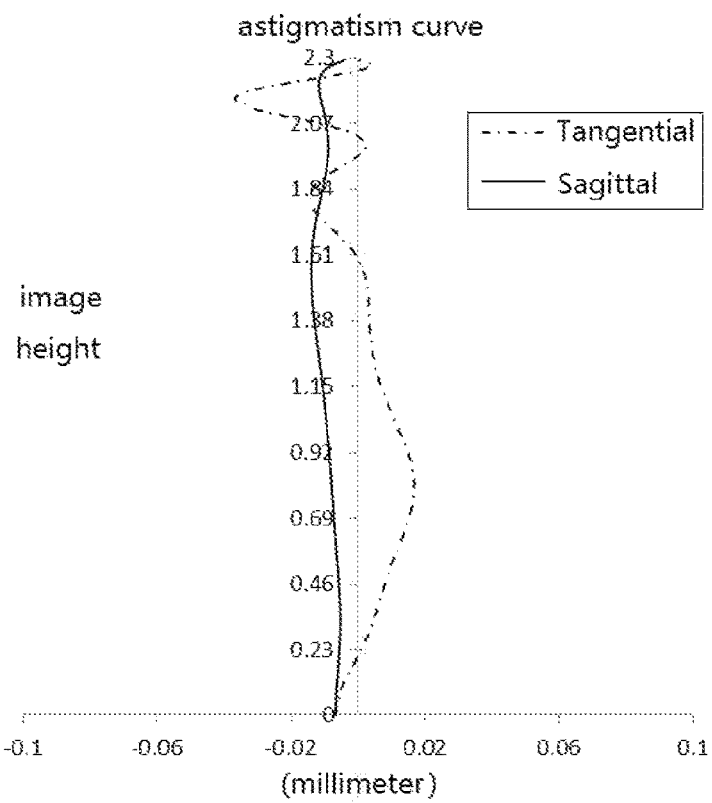
Figure 8C:
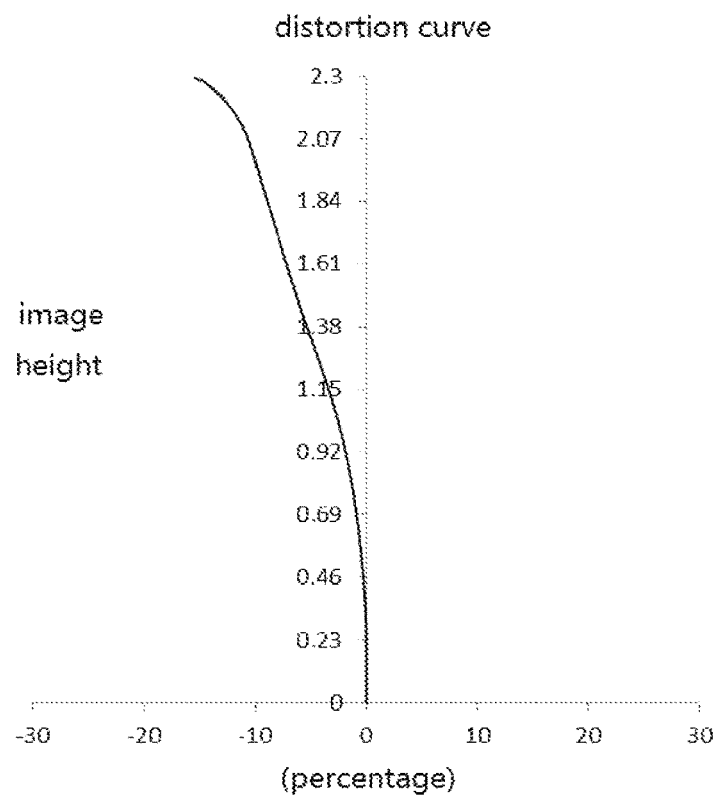
Figure 8D:
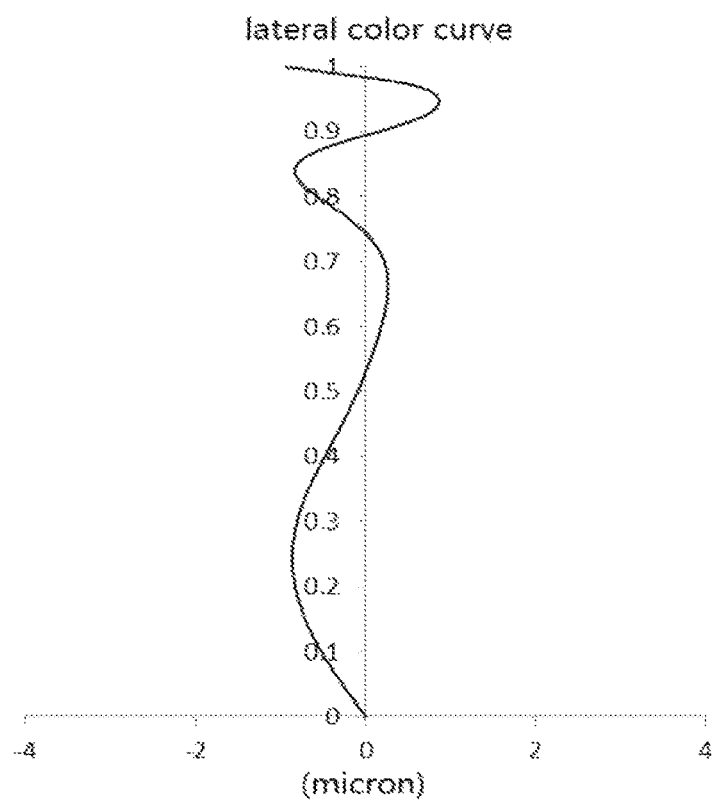

FIG. 8A shows a longitudinal aberration curve of the optical imaging system of Embodiment 4, which represents deviations of convergence focal points after light of different wavelengths passes through the system. FIG. 8B shows an astigmatism curve of the optical imaging system of Embodiment 4, which represents a meridional field curvature and a sagittal field curvature. FIG. 8C shows a distortion curve of the optical imaging system of Embodiment 4, which represents distortion values at different image heights. FIG. 8D shows a lateral color curve of the optical imaging system of Embodiment 4, which represents deviations of different image heights on the imaging surface after light passes through the system. From FIGS. 8A to 8D, it can be determined that the optical imaging system provided in Embodiment 4 can achieve a good imaging quality.

Embodiment 5

Figure 9:
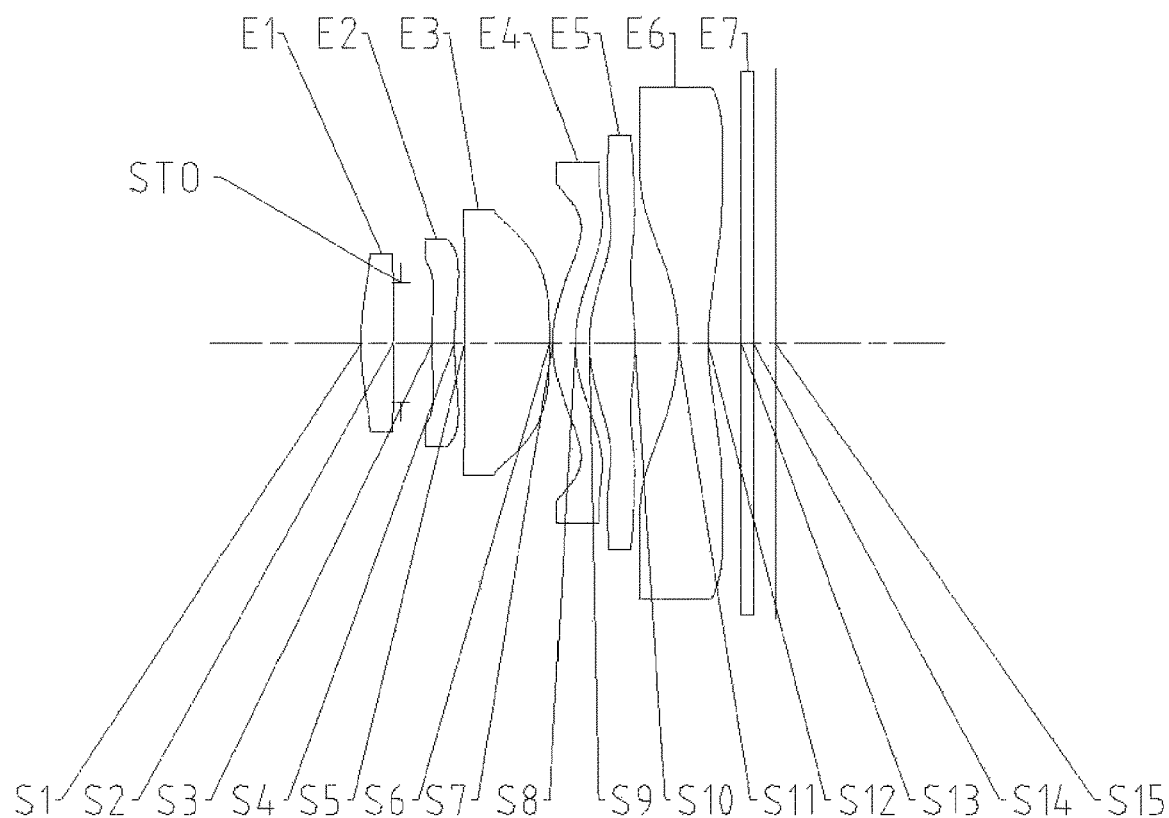
FIG. 9 shows a schematic structure diagram of an optical imaging system according to Embodiment 5 of the disclosure.

An optical imaging system according to Embodiment 5 of the disclosure will be described below with reference to FIGS. 9 to 10D. FIG. 9 shows a schematic structure diagram of an optical imaging system according to Embodiment 5 of the disclosure.

As shown in FIG. 9, the optical imaging system according to an exemplary embodiment of the disclosure includes, sequentially from an object side to an image side along an optical axis: a first lens E1, a diaphragm STO, a second lens E2, a third lens E3, a fourth lens E4, a fifth lens E5, a sixth lens E6, an optical filter E7, and an imaging surface S15.

The first lens E1 has a positive focal power, an object side surface S1 thereof is a convex surface, and an image side surface S2 thereof is a concave surface; the second lens E2 has a negative focal power, an object side surface S3 thereof is a convex surface, and an image side surface S4 thereof is a concave surface; the third lens E3 has a positive focal power, an object side surface S5 thereof is a concave surface, and an image side surface S6 thereof is a convex surface; the fourth lens E4 has a negative focal power, an object side surface S7 thereof is a convex surface, and an image side surface thereof S8 is a concave surface; the fifth lens E5 has a positive focal power, an object side surface S9 thereof is a convex surface, and an image side surface S10 thereof is a convex surface; and the sixth lens E6 has a negative focal power, an object side surface S11 is a concave surface, and an image side surface S12 thereof is a concave surface. The optical filter E7 has an object side surface S13 and an image side surface S14. Light from an object sequentially passes through the respective surfaces S1 to S14 and is finally imaged on the imaging surface S15.

Table 13 shows the surface type, curvature radius, thickness, material and conic coefficient of each lens of the optical imaging system of Embodiment 5, wherein the units of the curvature radius and the thickness are both millimeter (mm). Table 14 shows high-order coefficients which can be used for the aspherical lens surfaces in Embodiment 5, wherein the surface shape of the aspherical surfaces can be defined by formula (1) given in Embodiment 1 above. Table 15 shows the effective focal lengths f1 to f6 of the lenses in Embodiment 5, the total effective focal length f of the optical imaging system, the distance TTL on the optical axis from the object side surface S1 of the first lens E1 to the imaging surface S15, and the maximum half field of view (HFOV).

TABLE 13

| Surface number | Surface type | Curvature radius | Thickness | Material Refractive index | Abbe number | Conic coefficient |
|---|---|---|---|---|---|---|
| OBJ | Spherical | Infinite | Infinite | | | |
| S1 | Aspherical | 2.4334 | 0.2897 | 1.55 | 56.1 | −8.2838 |
| S2 | Aspherical | 8.5783 | 0.0664 | | | −99.0000 |
| STO | Spherical | Infinite | 0.2857 | | | |
| S3 | Aspherical | 3.8555 | 0.2038 | 1.67 | 20.4 | 10.4816 |
| S4 | Aspherical | 2.9402 | 0.0937 | | | −22.0515 |
| S5 | Aspherical | −36.4859 | 0.7661 | 1.55 | 56.1 | 65.1468 |
| S6 | Aspherical | −7.3504 | 0.0300 | | | −11.3318 |
| S7 | Aspherical | 1.1857 | 0.2000 | 1.67 | 20.4 | −2.6690 |
| S8 | Aspherical | 1.1044 | 0.1280 | | | −7.6163 |
| S9 | Aspherical | 1.3205 | 0.4114 | 1.55 | 56.1 | −7.1532 |
| S10 | Aspherical | −2.0118 | 0.3926 | | | −15.2040 |
| S11 | Aspherical | −1.7630 | 0.2700 | 1.67 | 20.4 | −0.7019 |
| S12 | Aspherical | 2.2104 | 0.3011 | | | −23.6449 |
| S13 | Spherical | Infinite | 0.1100 | 1.52 | 64.2 | |
| S14 | Spherical | Infinite | 0.2000 | | | |
| S15 | Spherical | Infinite | | | | |

TABLE 14

| Surface number | A4 | A6 | A8 | A10 | A12 | A14 | A16 |
|---|---|---|---|---|---|---|---|
| S1 | −1.7574E−02 | 3.3035E−01 | −2.9492E+00 | 1.1040E+01 | −2.3336E+01 | 2.4989E+01 | −1.0522E+01 |
| S2 | −8.1625E−02 | −2.5537E−01 | 9.0482E−01 | −2.3311E+00 | −2.0090E+00 | 1.6267E+01 | −1.6322E+01 |
| S3 | −2.6423E−01 | −1.0190E+00 | 5.6133E+00 | −2.3102E+01 | 5.4163E+01 | −7.2204E+01 | 3.9439E+01 |
| S4 | 4.3667E−02 | −1.0278E+00 | 3.1098E+00 | −6.5571E+00 | 8.0865E+00 | −5.5926E+00 | 1.6000E+00 |
| S5 | 1.7251E−01 | −6.2926E−01 | 1.3522E+00 | −1.9263E+00 | 1.5941E+00 | −6.7047E−01 | 1.0875E−01 |
| S6 | −1.6741E−01 | −6.7333E−01 | 1.2506E+00 | −1.1062E+00 | 4.1943E−01 | 2.4434E−02 | −3.6080E−02 |
| S7 | −1.1269E−02 | 5.7896E−03 | −2.0235E−01 | 2.7019E−01 | −2.4347E−01 | 1.1217E−01 | −1.8631E−02 |
| S8 | 2.2415E−01 | −4.2546E−01 | 2.7040E−01 | −1.2870E−01 | 6.1007E−02 | −1.8561E−02 | 2.2510E−03 |
| S9 | 1.3171E−01 | −1.9108E−01 | −1.7884E−01 | 3.1890E−01 | −1.6516E−01 | 3.7771E−02 | −3.2910E−03 |
| S10 | 2.4723E−01 | 1.1356E−01 | −4.6369E−01 | 3.6301E−01 | −1.3105E−01 | 2.3018E−02 | −1.5918E−03 |
| S11 | 6.0326E−02 | −8.7112E−02 | 1.1821E−01 | −5.8787E−02 | 1.3598E−02 | −1.4486E−03 | 5.3399E−05 |
| S12 | 9.4238E−03 | −5.5112E−02 | 3.0137E−02 | −5.0002E−03 | −4.5751E−04 | 2.1785E−04 | −1.7383E−05 |

TABLE 15

| | |
|---|---|
| f1 (mm) | 6.21 |
| f2 (mm) | −24.30 |
| f3 (mm) | 18.73 |
| f4 (mm) | −103.94 |
| f5 (mm) | 1.54 |
| f6 (mm) | −1.62 |
| f (mm) | 2.32 |
| TTL (mm) | 3.75 |
| HFOV (°) | 52.00 |

Figure 10A:
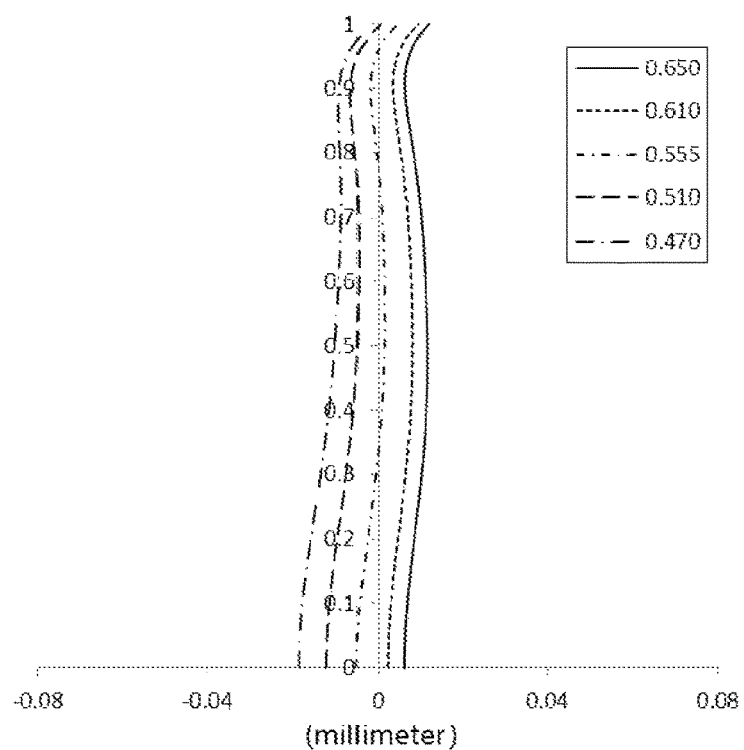
FIGS. 10A to 10D respectively show a longitudinal aberration curve, an astigmatism curve, a distortion curve, and a lateral color curve of the optical imaging system of Embodiment 5.
Figure 10B:
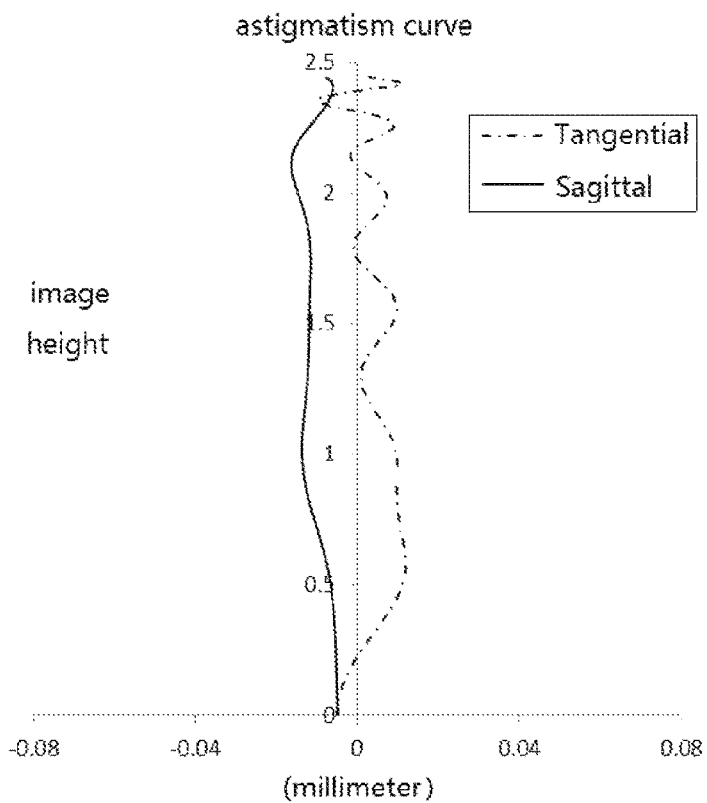
Figure 10C:
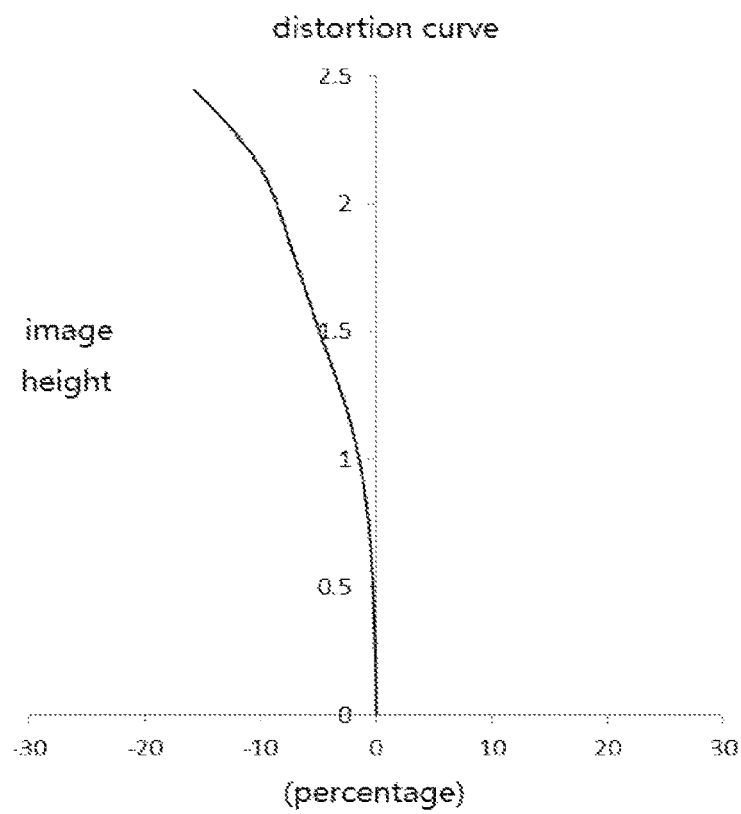
Figure 10D:
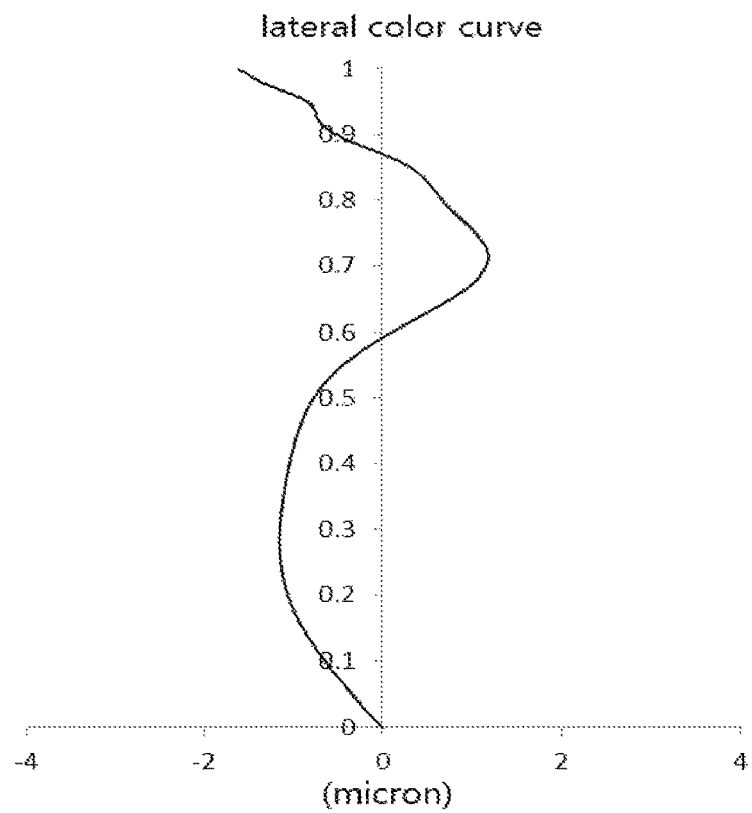

FIG. 10A shows a longitudinal aberration curve of the optical imaging system of Embodiment 5, which represents deviations of convergence focal points after light of different wavelengths passes through the system. FIG. 10B shows an astigmatism curve of the optical imaging system of Embodiment 5, which represents a meridional field curvature and a sagittal field curvature. FIG. 10C shows a distortion curve of the optical imaging system of Embodiment 5, which represents distortion values at different image heights. FIG. 10D shows a lateral color curve of the optical imaging system of Embodiment 5, which represents deviations of different image heights on the imaging surface after light passes through the system. From FIGS. 10A to 10D, it can be determined that the optical imaging system provided in Embodiment 5 can achieve a good imaging quality.

Embodiment 6

Figure 11:
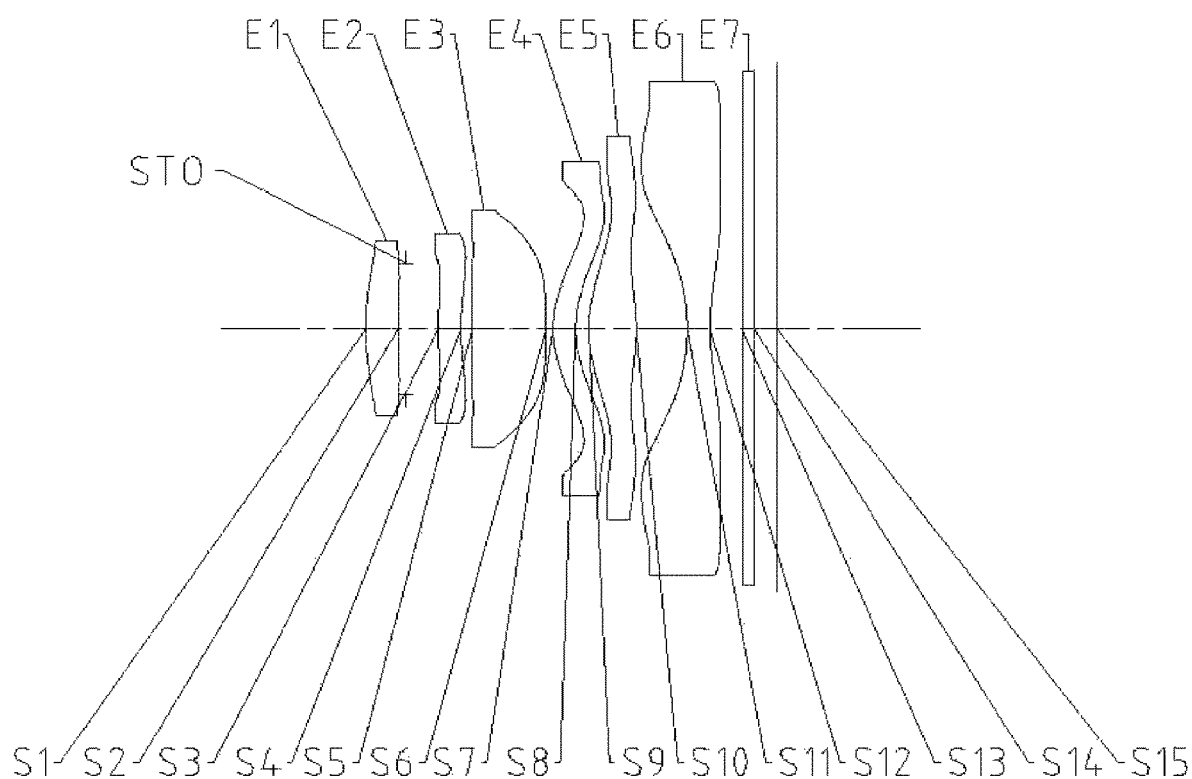
FIG. 11 shows a schematic structure diagram of an optical imaging system according to Embodiment 6 of the disclosure.

An optical imaging system according to Embodiment 6 of the disclosure will be described below with reference to FIGS. 11 to 12D. FIG. 11 shows a schematic structure diagram of an optical imaging system according to Embodiment 6 of the disclosure.

As shown in FIG. 11, the optical imaging system according to an exemplary embodiment of the disclosure includes, sequentially from an object side to an image side along an optical axis: a first lens E1, a diaphragm STO, a second lens E2, a third lens E3, a fourth lens E4, a fifth lens E5, a sixth lens E6, an optical filter E7, and an imaging surface S15.

The first lens E1 has a positive focal power, an object side surface S1 thereof is a convex surface, and an image side surface S2 thereof is a concave surface; the second lens E2 has a negative focal power, an object side surface S3 thereof is a convex surface, and an image side surface S4 thereof is a concave surface; the third lens E3 has a positive focal power, an object side surface S5 thereof is a concave surface, and an image side surface S6 thereof is a convex surface; the fourth lens E4 has a positive focal power, an object side surface S7 thereof is a convex surface, and an image side surface S8 thereof is a concave surface; the fifth lens E5 has a positive focal power, an object side surface S9 thereof is a convex surface, and an image side surface S10 thereof is a convex surface; and the sixth lens E6 has a negative focal power, an object side surface S11 is a concave surface, and an image side surface S12 thereof is a concave surface. The optical filter E7 has an object side surface S13 and an image side surface S14. Light from an object sequentially passes through the respective surfaces S1 to S14 and is finally imaged on the imaging surface S15.

Table 16 shows the surface type, curvature radius, thickness, material and conic coefficient of each lens of the optical imaging system of Embodiment 6, wherein the units of the curvature radius and the thickness are both millimeter (mm). Table 17 shows high-order coefficients which can be used for the aspherical lens surfaces in Embodiment 6, wherein the surface shape of the aspherical surfaces can be defined by formula (1) given in Embodiment 1 above. Table 18 shows the effective focal lengths f1 to f6 of the lenses in Embodiment 6, the total effective focal length f of the optical imaging system, the distance TTL on the optical axis from the object side surface S1 of the first lens E1 to the imaging surface S15, and the maximum half field of view (HFOV).

Figure 12A:
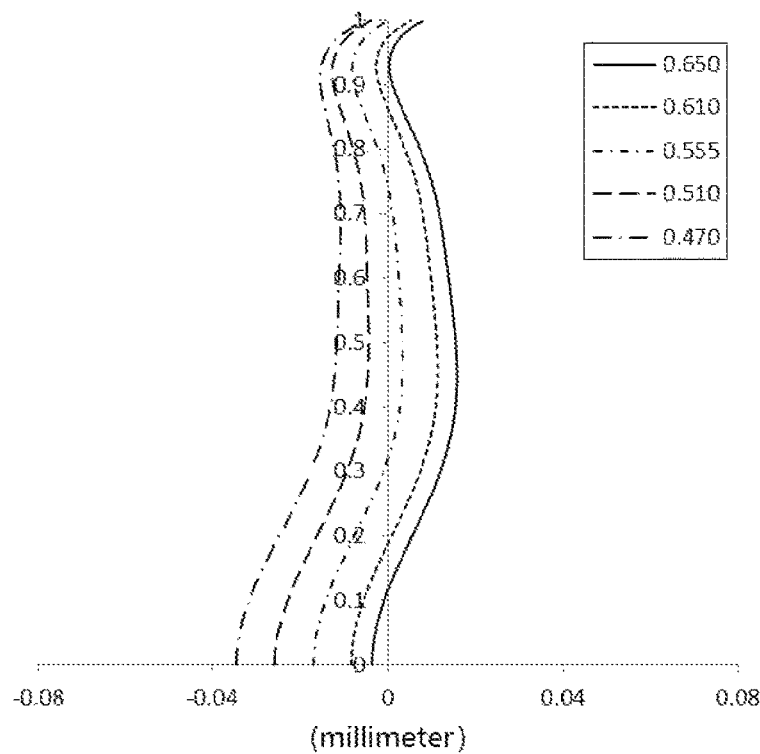
FIGS. 12A to 12D respectively show a longitudinal aberration curve, an astigmatism curve, a distortion curve, and a lateral color curve of the optical imaging system of Embodiment 6.
Figure 12B:
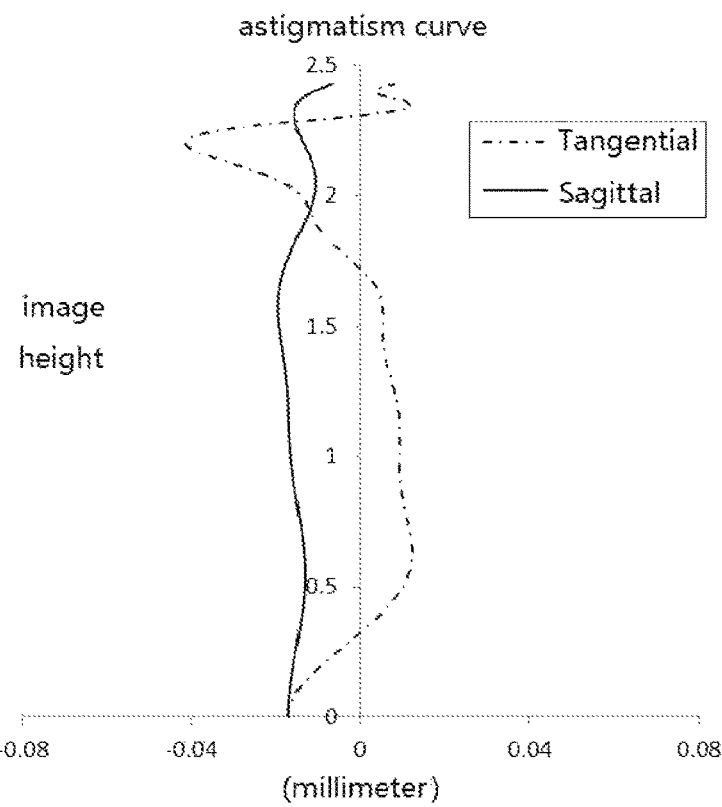
Figure 12C:
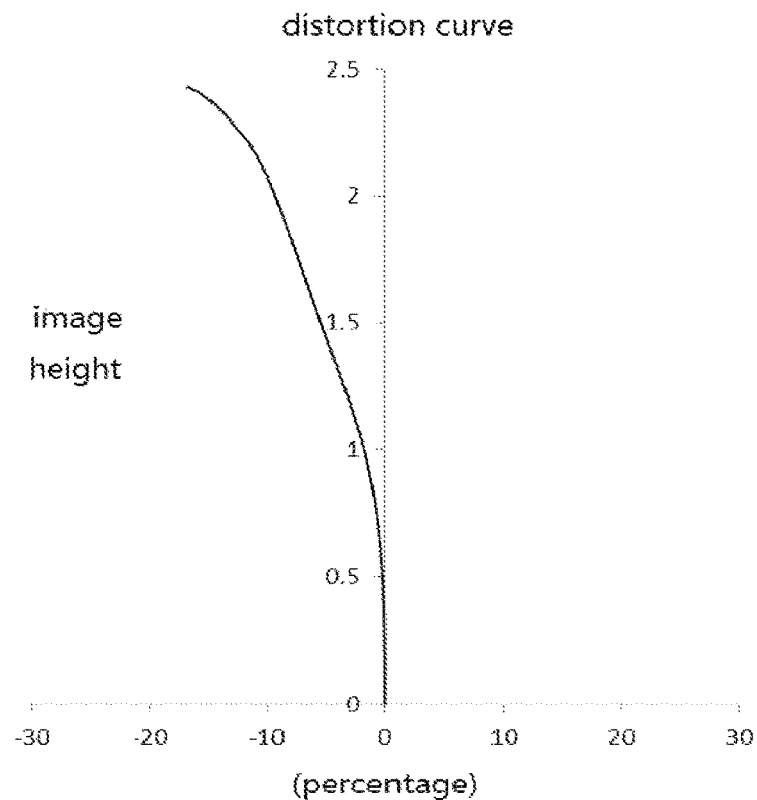
Figure 12D:
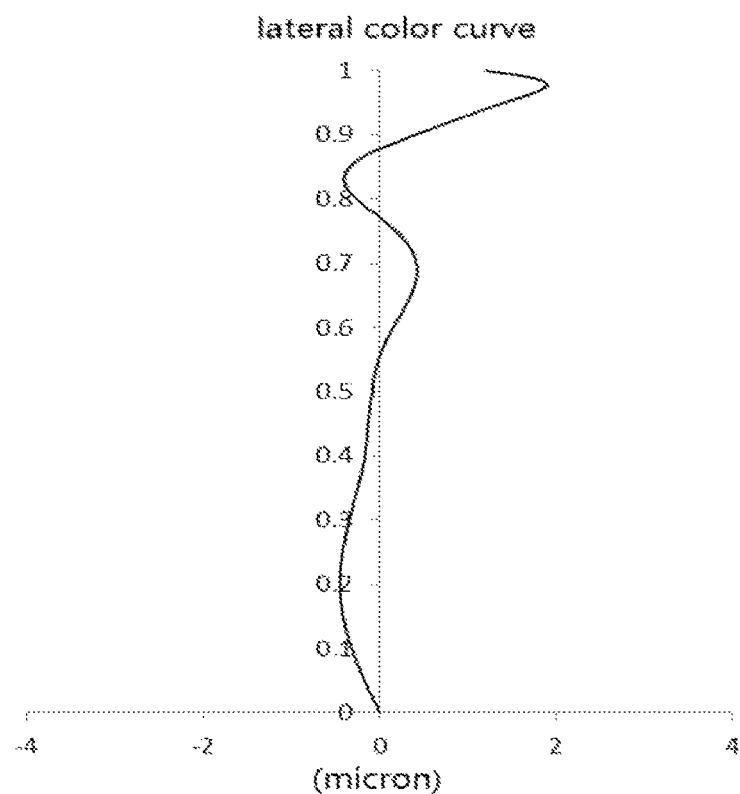

FIG. 12A shows a longitudinal aberration curve of the optical imaging system of Embodiment 6, which represents deviations of convergence focal points after light of different wavelengths passes through the system. FIG. 12B shows an astigmatism curve of the optical imaging system of Embodiment 6, which represents a meridional field curvature and a sagittal field curvature. FIG. 12C shows a distortion curve of the optical imaging system of Embodiment 6, which represents distortion values at different image heights. FIG. 12D shows a lateral color curve of the optical imaging system of Embodiment 6, which represents deviations of different image heights on the imaging surface after light passes through the system. From FIGS. 12A to 12D, it can be determined that the optical imaging system provided in Embodiment 6 can achieve a good imaging quality.

TABLE 16

| Surface number | Surface type | Curvature radius | Thickness | Material Refractive index | Abbe number | Conic coefficient |
|---|---|---|---|---|---|---|
| OBJ | Spherical | Infinite | Infinite | | | |
| S1 | Aspherical | 2.4944 | 0.2872 | 1.55 | 56.1 | −9.1938 |
| S2 | Aspherical | 7.4596 | 0.0694 | | | −61.5358 |
| STO | Spherical | Infinite | 0.2843 | | | |
| S3 | Aspherical | 3.4435 | 0.2000 | 1.67 | 20.4 | 7.7411 |
| S4 | Aspherical | 2.7039 | 0.1002 | | | −18.8591 |
| S5 | Aspherical | −64.5909 | 0.6494 | 1.55 | 56.1 | 99.0000 |
| S6 | Aspherical | −11.0965 | 0.0627 | | | 15.0201 |
| S7 | Aspherical | 1.0662 | 0.2000 | 1.67 | 20.4 | −2.6531 |
| S8 | Aspherical | 1.0315 | 0.1208 | | | −7.2896 |
| S9 | Aspherical | 1.3159 | 0.4186 | 1.55 | 56.1 | −7.0461 |
| S10 | Aspherical | −2.0944 | 0.4508 | | | −21.4459 |
| S11 | Aspherical | −1.7689 | 0.2000 | 1.67 | 20.4 | −0.7067 |
| S12 | Aspherical | 2.4417 | 0.2839 | | | −11.3204 |
| S13 | Spherical | Infinite | 0.1100 | 1.52 | 64.2 | |
| S14 | Spherical | Infinite | 0.2000 | | | |
| S15 | Spherical | Infinite | | | | |

TABLE 17

| Surface number | A4 | A6 | A8 | A10 | A12 | A14 | A16 |
|---|---|---|---|---|---|---|---|
| S1 | −1.1896E−02 | 2.4901E−01 | −1.9392E+00 | 6.0941E+00 | −1.0569E+01 | 9.0534E+00 | −3.0020E+00 |
| S2 | −7.1360E−02 | −1.4681E−01 | −2.3252E−01 | 4.1863E+00 | −1.7623E+01 | 2.9986E+01 | −1.8276E+01 |
| S3 | −3.3088E−01 | 6.1369E−02 | −2.8125E+00 | 1.4998E+01 | −4.6411E+01 | 7.2924E+01 | −4.8288E+01 |
| S4 | −4.6552E−03 | −5.3770E−01 | 1.1800E+00 | −1.9661E+00 | 1.3544E+00 | 1.3450E−01 | −5.3428E−01 |
| S5 | 1.2812E−01 | −5.0149E−01 | 1.4932E+00 | −2.8734E+00 | 2.9974E+00 | −1.5925E+00 | 3.5648E−01 |
| S6 | −2.3611E−01 | −9.3892E−01 | 3.0682E+00 | −5.3134E+00 | 5.4278E+00 | −3.0732E+00 | 7.5117E−01 |
| S7 | 3.2083E−03 | −2.3146E−01 | 4.0719E−01 | −4.2522E−01 | 1.9653E−01 | −4.2701E−02 | 4.9037E−03 |
| S8 | 2.8631E−01 | −7.6897E−01 | 1.0639E+00 | −1.0172E+00 | 5.6957E−01 | −1.6254E−01 | 1.8281E−02 |
| S9 | −3.2913E−02 | 7.2098E−02 | −1.4303E−01 | 4.9682E−02 | 1.9589E−02 | −1.3526E−02 | 1.9568E−03 |
| S10 | 7.4593E−02 | 3.4909E−01 | −5.4945E−01 | 3.3391E−01 | −1.0161E−01 | 1.5256E−02 | −8.8250E−04 |
| S11 | 7.9147E−02 | −2.1683E−01 | 2.5279E−01 | −1.2384E−01 | 3.0840E−02 | −3.8758E−03 | 1.9552E−04 |
| S12 | −7.5247E−02 | −8.0941E−04 | 2.0775E−02 | −9.1942E−03 | 1.7845E−03 | −1.5960E−04 | 4.7889E−06 |

TABLE 18

| f1 (mm) | 6.76 |
|---|---|
| f2 (mm) | −21.45 |
| f3 (mm) | 24.57 |
| f4 (mm) | 37.45 |
| f5 (mm) | 1.56 |
| f6 (mm) | −1.53 |
| f (mm) | 2.27 |
| TTL (mm) | 3.64 |
| HFOV (°) | 52.0 |

Embodiment 7

Figure 13:
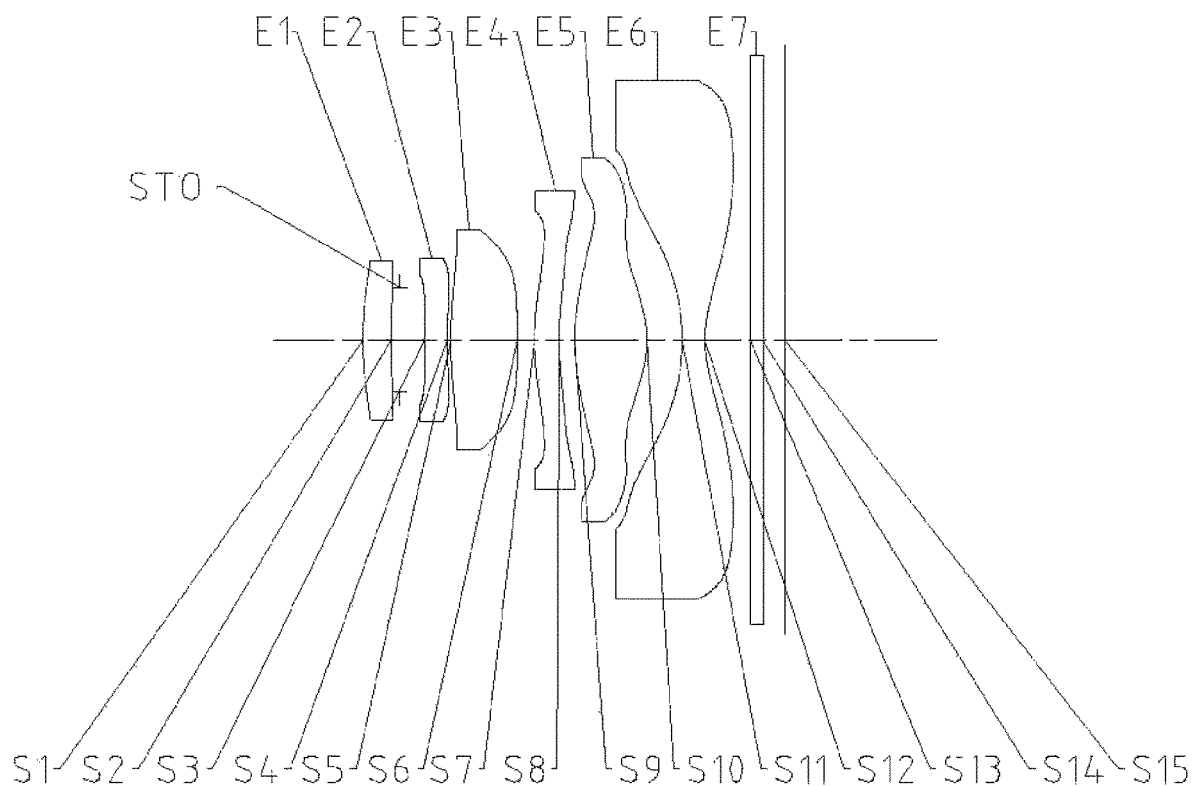
FIG. 13 shows a schematic structure diagram of an optical imaging system according to Embodiment 7 of the disclosure.

An optical imaging system according to Embodiment 7 of the disclosure will be described below with reference to FIGS. 13 to 14D. FIG. 13 shows a schematic structure diagram of an optical imaging system according to Embodiment 7 of the disclosure.

As shown in FIG. 13, the optical imaging system according to an exemplary embodiment of the disclosure includes, sequentially from an object side to an image side along an optical axis: a first lens E1, a diaphragm STO, a second lens E2, a third lens E3, a fourth lens E4, a fifth lens E5, a sixth lens E6, an optical filter E7, and an imaging surface S15.

The first lens E1 has a positive focal power, an object side surface S1 thereof is a convex surface, and an image side surface S2 thereof is a concave surface; the second lens E2 has a negative focal power, an object side surface S3 thereof is a convex surface, and an image side surface S4 thereof is a concave surface; the third lens E3 has a positive focal power, an object side surface S5 thereof is a convex surface, and an image side surface S6 thereof is a convex surface; the fourth lens E4 has a positive focal power, an object side surface S7 thereof is a convex surface, and an image side surface S8 thereof is a concave surface; the fifth lens E5 has a positive focal power, an object side surface S9 thereof is a convex surface, and an image side surface S10 thereof is a convex surface; and the sixth lens E6 has a negative focal power, an object side surface S11 is a concave surface, and an image side surface S12 thereof is a concave surface. The optical filter E7 has an object side surface S13 and an image side surface S14. Light from an object sequentially passes through the respective surfaces S1 to S14 and is finally imaged on the imaging surface S15.

Table 19 shows the surface type, curvature radius, thickness, material and conic coefficient of each lens of the optical imaging system of Embodiment 7, wherein the units of the curvature radius and the thickness are both millimeter (mm). Table 20 shows high-order coefficients which can be used for the aspherical lens surfaces in Embodiment 7, wherein the surface shape of the aspherical surfaces can be defined by formula (1) given in Embodiment 1 above. Table 21 shows the effective focal lengths f1 to f6 of the lenses in Embodiment 7, the total effective focal length f of the optical imaging system, the distance TTL on the optical axis from the object side surface S1 of the first lens E1 to the imaging surface S15, and the maximum half field of view (HFOV).

TABLE 19

| Surface number | Surface type | Curvature radius | Thickness | Material Refractive index | Abbe number | Conic coefficient |
| --- | --- | --- | --- | --- | --- | --- |
| OBJ | Spherical | Infinite | Infinite | | | |
| S1 | Aspherical | 3.1101 | 0.2491 | 1.55 | 56.1 | −19.2662 |
| S2 | Aspherical | 6.2919 | 0.0751 | | | 1.5406 |
| STO | Spherical | Infinite | 0.2200 | | | |
| S3 | Aspherical | 11.7586 | 0.2045 | 1.67 | 20.4 | −76.7118 |
| S4 | Aspherical | 6.0442 | 0.0325 | | | −16.9187 |
| S5 | Aspherical | 4.5626 | 0.5881 | 1.55 | 56.1 | −99.0000 |
| S6 | Aspherical | −24.327 | 0.1520 | | | 99.0000 |
| S7 | Aspherical | 2.9521 | 0.2200 | 1.67 | 20.4 | −2.2156 |
| S8 | Aspherical | 3.8631 | 0.1367 | | | −36.4672 |
| S9 | Aspherical | 2.1214 | 0.6447 | 1.55 | 56.1 | −6.3092 |
| S10 | Aspherical | −1.0923 | 0.3140 | | | −3.4655 |
| S11 | Aspherical | −2.0346 | 0.2000 | 1.67 | 20.4 | −0.0593 |
| S12 | Aspherical | 1.2252 | 0.4034 | | | −7.2981 |
| S13 | Spherical | Infinite | 0.1100 | 1.52 | 64.2 | |
| S14 | Spherical | Infinite | 0.2000 | | | |
| S15 | Spherical | Infinite | | | | |

TABLE 20

| Surface number | A4 | A6 | A8 | A10 | A12 | A14 | A16 |
| --- | --- | --- | --- | --- | --- | --- | --- |
| S1 | 1.3712E−02 | 2.2914E−01 | −2.0228E+00 | 7.4502E+00 | −1.6545E+01 | 1.8908E+01 | −8.5437E+00 |
| S2 | 1.3516E−02 | −1.5086E+00 | 1.5357E+01 | −9.3861E+01 | 3.1059E+02 | −5.3390E+02 | 3.7608E+02 |
| S3 | −2.5261E−01 | 1.4488E+00 | −2.2319E+01 | 1.4862E+02 | −5.5407E+02 | 1.0734E+03 | −8.6668E+02 |
| S4 | 1.5948E−02 | −9.0478E−01 | 1.4844E+00 | 1.2335E+00 | −1.1975E+01 | 2.0835E+01 | −1.2975E+01 |
| S5 | 1.7280E−01 | −8.1380E−01 | 1.9863E+00 | −3.3017E+00 | 3.6498E+00 | −2.3465E+00 | 6.5292E−01 |
| S6 | −1.8277E−01 | −6.0771E−01 | 1.9850E+00 | −3.6793E+00 | 3.6893E+00 | −1.9176E+00 | 4.2940E−01 |
| S7 | 1.3230E−01 | −1.1498E+00 | 2.6440E+00 | −3.2347E+00 | 2.2806E+00 | −8.9934E−01 | 1.5160E−01 |
| S8 | 2.0236E−01 | −1.0479E+00 | 1.8480E+00 | −1.5315E+00 | 6.4170E−01 | −1.2769E−01 | 8.8957E−03 |
| S9 | −7.4118E−02 | 1.0561E−01 | −1.6431E−01 | 2.4446E−01 | −2.1495E−01 | 8.4607E−02 | −1.1905E−02 |
| S10 | 1.1350E−01 | −2.0574E−04 | 2.0595E−01 | −3.0007E−01 | 1.5776E−01 | −3.6790E−02 | 3.1968E−03 |
| S11 | −1.4519E−02 | −4.8344E−03 | 2.3636E−02 | −5.2247E−03 | 0.0000E+00 | 0.0000E+00 | 0.0000E+00 |
| S12 | −8.2066E−02 | 3.8165E−02 | −1.1472E−02 | 1.8960E−03 | −1.3100E−04 | 0.0000E+00 | 0.0000E+00 |

TABLE 21

| | |
|---|---|
| f1 (mm) | 11.02 |
| f2 (mm) | −19.19 |
| f3 (mm) | 7.13 |
| f4 (mm) | 17.38 |
| f5 (mm) | 1.43 |
| f6 (mm) | −1.18 |
| f (mm) | 2.23 |
| TTL (mm) | 3.75 |
| HFOV (°) | 58.1 |

Figure 14A:
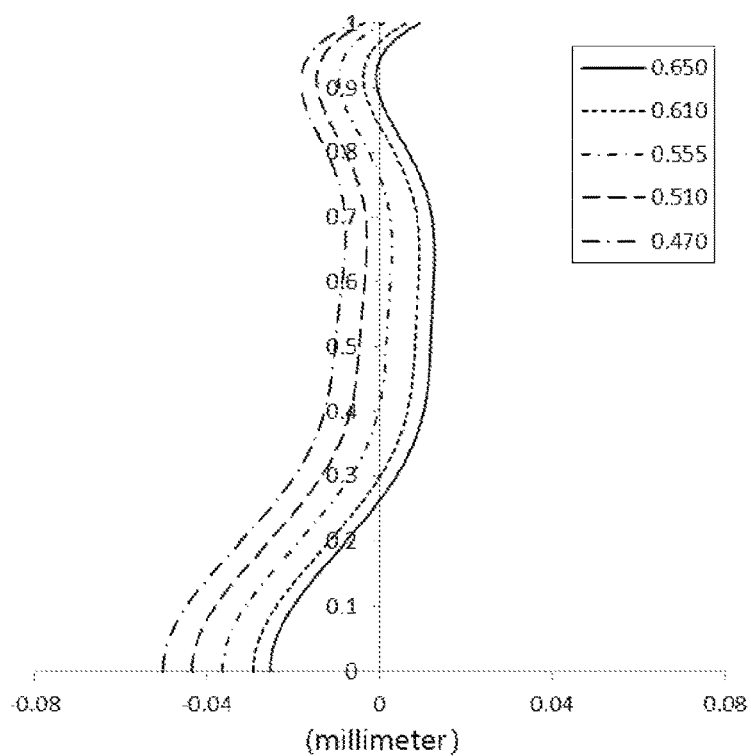
FIGS. 14A to 14D respectively show a longitudinal aberration curve, an astigmatism curve, a distortion curve, and a lateral color curve of the optical imaging system of Embodiment 7.
Figure 14B:
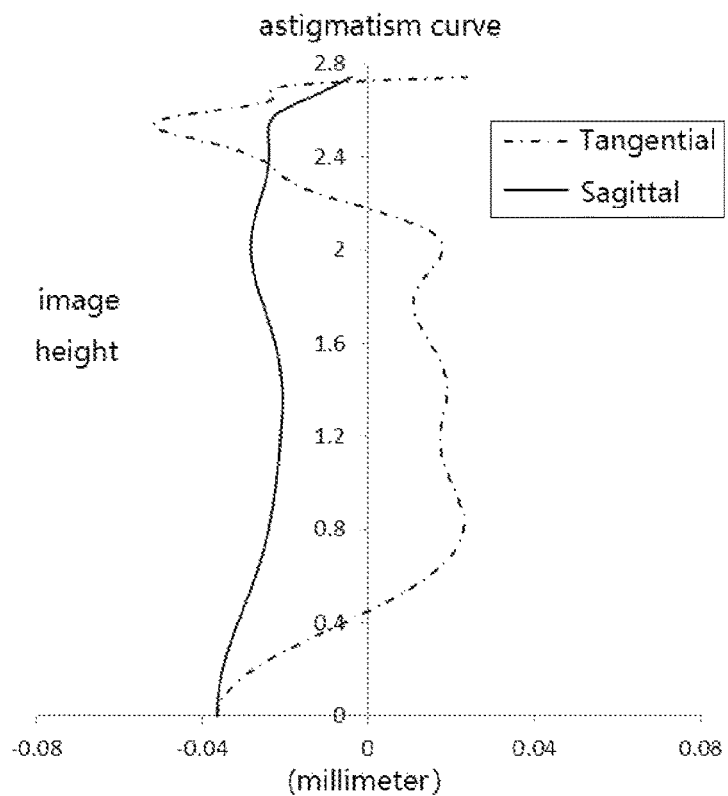
Figure 14C:
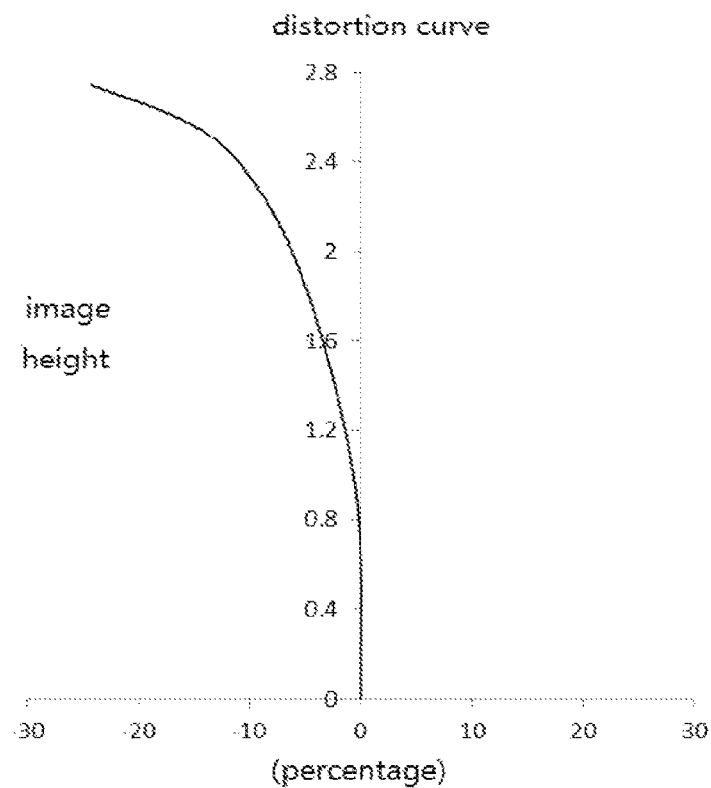
Figure 14D:
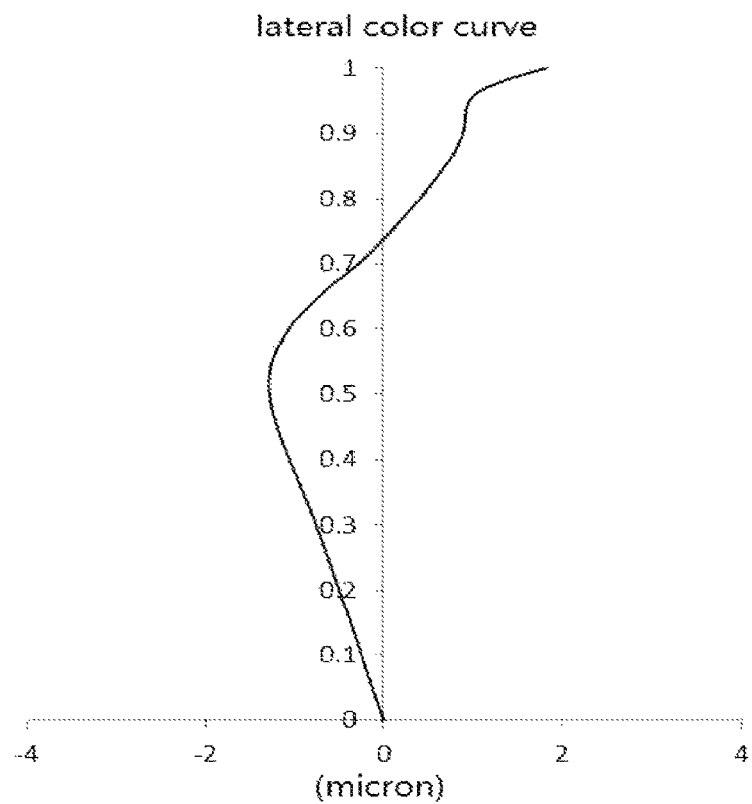

FIG. 14A shows a longitudinal aberration curve of the optical imaging system of Embodiment 7, which represents deviations of convergence focal points after light of different wavelengths passes through the system. FIG. 14B shows an astigmatism curve of the optical imaging system of Embodiment 7, which represents a meridional field curvature and a sagittal field curvature. FIG. 14C shows a distortion curve of the optical imaging system of Embodiment 7, which represents distortion values at different image heights. FIG. 14D shows a lateral color curve of the optical imaging system of Embodiment 7, which represents deviations of different image heights on the imaging surface after light passes through the system. From FIGS. 14A to 14D, it can be determined that the optical imaging system provided in Embodiment 7 can achieve a good imaging quality.

Embodiment 8

Figure 15:
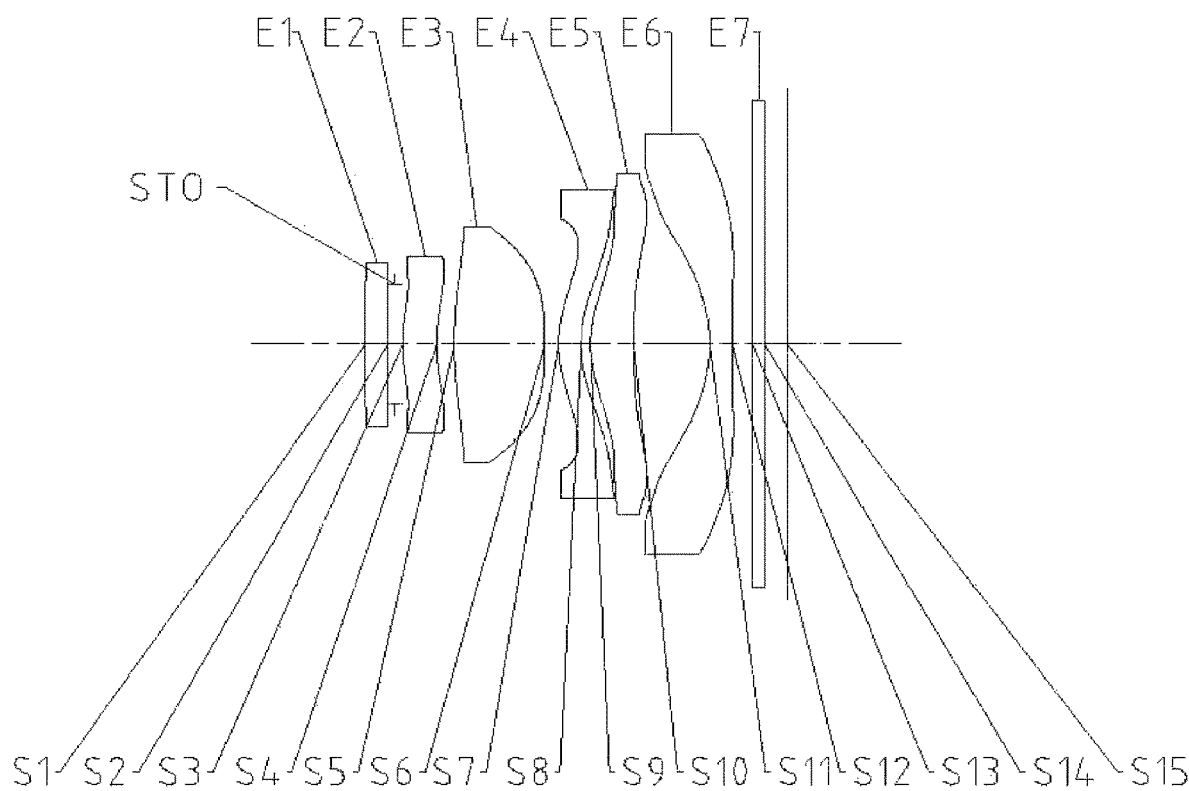
FIG. 15 shows a schematic structure diagram of an optical imaging system according to Embodiment 8 of the disclosure.

An optical imaging system according to Embodiment 8 of the disclosure will be described below with reference to FIGS. 15 to 16D. FIG. 15 shows a schematic structure diagram of an optical imaging system according to Embodiment 8 of the disclosure.

As shown in FIG. 15, the optical imaging system according to an exemplary embodiment of the disclosure includes, sequentially from an object side to an image side along an optical axis: a first lens E1, a diaphragm STO, a second lens E2, a third lens E3, a fourth lens E4, a fifth lens E5, a sixth lens E6, an optical filter E7, and an imaging surface S15.

The first lens E1 has a negative focal power, an object side surface S1 thereof is a convex surface, and an image side surface S2 thereof is a concave surface; the second lens E2 has a positive focal power, an object side surface S3 thereof is a convex surface, and an image side surface S4 thereof is a concave surface; the third lens E3 has a positive focal power, an object side surface S5 thereof is a convex surface, and an image side surface S6 thereof is a convex surface; the fourth lens E4 has a negative focal power, an object side surface S7 thereof is a convex surface, and an image side surface thereof S8 is a concave surface; the fifth lens E5 has a positive focal power, an object side surface S9 thereof is a convex surface, and an image side surface S10 thereof is a concave surface; and the sixth lens E6 has a negative focal power, an object side surface S11 is a concave surface, and an image side surface S12 thereof is a convex surface. The optical filter E7 has an object side surface S13 and an image side surface S14. Light from an object sequentially passes through the respective surfaces S1 to S14 and is finally imaged on the imaging surface S15.

Table 22 shows the surface type, curvature radius, thickness, material and conic coefficient of each lens of the optical imaging system of Embodiment 8, wherein the units of the curvature radius and the thickness are both millimeter (mm). Table 23 shows high-order coefficients which can be used for the aspherical lens surfaces in Embodiment 8, wherein the surface shape of the aspherical surfaces can be defined by formula (1) given in Embodiment 1 above. Table 24 shows the effective focal lengths f1 to f6 of the lenses in Embodiment 8, the total effective focal length f of the optical imaging system, the distance TTL on the optical axis from the object side surface S1 of the first lens E1 to the imaging surface S15, and the maximum half field of view (HFOV).

TABLE 22

| Surface number | Surface type | Curvature radius | Thickness | Material | | Conic coefficient |
|---|---|---|---|---|---|---|
| | | | | Refractive index | Abbe number | |
| OBJ | Spherical | Infinite | Infinite | | | |
| S1 | Aspherical | 12.3760 | 0.2000 | 1.55 | 56.1 | 78.0180 |
| S2 | Aspherical | 5.7516 | 0.0675 | | | −91.0486 |
| STO | Spherical | Infinite | 0.0684 | | | |
| S3 | Aspherical | 1.6935 | 0.3000 | 1.67 | 20.4 | 4.7177 |
| S4 | Aspherical | 1.8530 | 0.1546 | | | −14.2747 |
| S5 | Aspherical | 3.9643 | 0.7992 | 1.55 | 56.1 | −52.0450 |
| S6 | Aspherical | −5.3487 | 0.1226 | | | −25.7135 |
| S7 | Aspherical | 1.2933 | 0.2000 | 1.67 | 20.4 | −3.6877 |
| S8 | Aspherical | 1.0748 | 0.0858 | | | −11.1152 |
| S9 | Aspherical | 1.0335 | 0.3827 | 1.55 | 56.1 | −9.5268 |
| S10 | Aspherical | 9.8045 | 0.6714 | | | −99.0000 |
| S11 | Aspherical | −1.3537 | 0.2000 | 1.67 | 20.4 | −0.8540 |
| S12 | Aspherical | −114.460 | 0.1777 | | | 99.0000 |
| S13 | Spherical | Infinite | 0.1100 | 1.52 | 64.2 | |
| S14 | Spherical | Infinite | 0.2000 | | | |
| S15 | Spherical | Infinite | | | | |

TABLE 23

| Surface number | A4 | A6 | A8 | A10 | A12 | A14 | A16 |
|---|---|---|---|---|---|---|---|
| S1 | −1.2620E−01 | 5.2874E−01 | −1.5984E+00 | 4.1743E+00 | 8.0619E+00 | 8.5205E+00 | −3.7083E+00 |
| S2 | −3.6917E−01 | 1.4292E+00 | −4.9685E+00 | 1.6307E+01 | −4.2801E+01 | 6.3189E+01 | −3.7671E+01 |
| S3 | −7.0032E−01 | 1.6145E+00 | −1.3956E+01 | 7.0428E+01 | −2.2308E+02 | 3.8022E+02 | −2.7922E+02 |

TABLE 23-continued

| Surface number | A4 | A6 | A8 | A10 | A12 | A14 | A16 |
|---|---|---|---|---|---|---|---|
| S4 | 4.4026E−03 | −4.0453E−01 | 4.2892E−01 | 6.3252E−02 | −1.5753E+00 | 2.4582E+00 | −1.3167E+00 |
| S5 | 6.9479E−02 | −1.0399E−01 | −1.6129E−02 | 2.3608E−01 | −5.2015E−01 | 5.0357E−01 | −1.6601E−01 |
| S6 | −3.6897E−01 | −3.2006E−01 | 1.8044E+00 | −3.5843E+00 | 3.8745E+00 | −2.2590E+00 | 5.5486E−01 |
| S7 | −1.4538E−02 | −2.4175E−01 | 3.8164E−01 | −5.1322E−01 | 4.5211E−01 | −2.5478E−01 | 5.9531E−02 |
| S8 | 2.5392E−01 | −6.3135E−01 | 7.7704E−01 | −6.1690E−01 | 2.9962E−01 | −7.8307E−02 | 8.3288E−03 |
| S9 | 3.2383E−02 | −2.1516E−01 | 4.0344E−01 | −4.7769E−01 | 3.0349E−01 | −9.4291E−02 | 1.1372E−02 |
| S10 | 9.6932E−02 | −3.9889E−02 | 2.9936E−02 | −9.2128E−02 | 8.0602E−02 | −2.9306E−02 | 3.9378E−03 |
| S11 | 1.7227E−01 | −3.6333E−01 | 4.0184E−01 | −2.0599E−01 | 5.4993E−02 | −7.8526E−03 | 5.2927E−04 |
| S12 | 1.3136E−01 | −2.7833E−01 | 2.3574E−01 | −1.1399E−01 | 3.1839E−02 | −4.7191E−03 | 2.8487E−04 |

TABLE 24

| | |
|---|---|
| f1 (mm) | −20.00 |
| f2 (mm) | 17.14 |
| f3 (mm) | 4.32 |
| f4 (mm) | −15.20 |
| f5 (mm) | 2.10 |
| f6 (mm) | −2.09 |
| f (mm) | 2.34 |
| TTL (mm) | 3.74 |
| HFOV (°) | 52.0 |

Figure 16A:
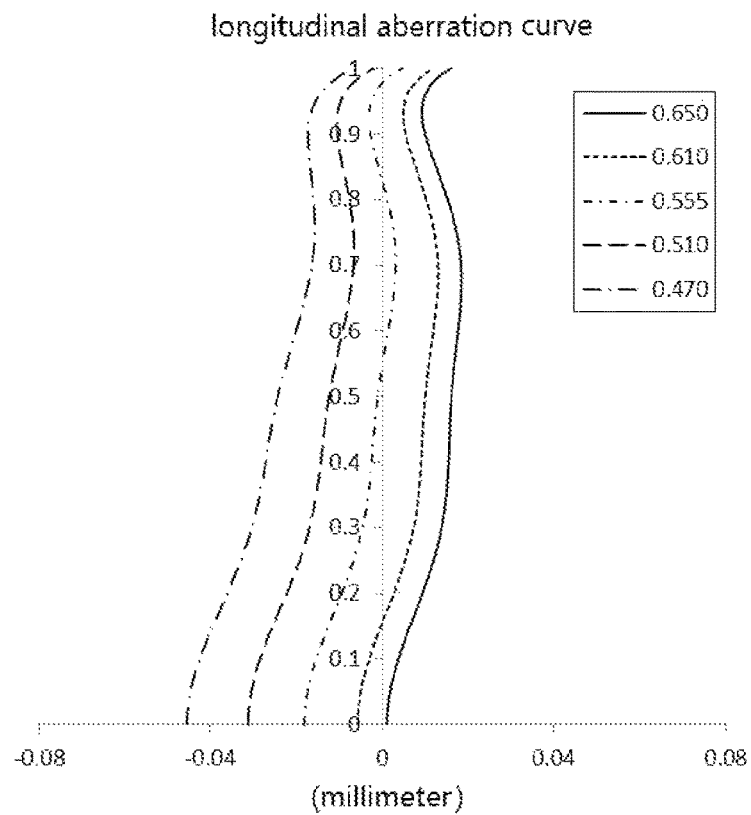
FIGS. 16A to 16D respectively show a longitudinal aberration curve, an astigmatism curve, a distortion curve, and a lateral color curve of the optical imaging system of Embodiment 8.
Figure 16B:
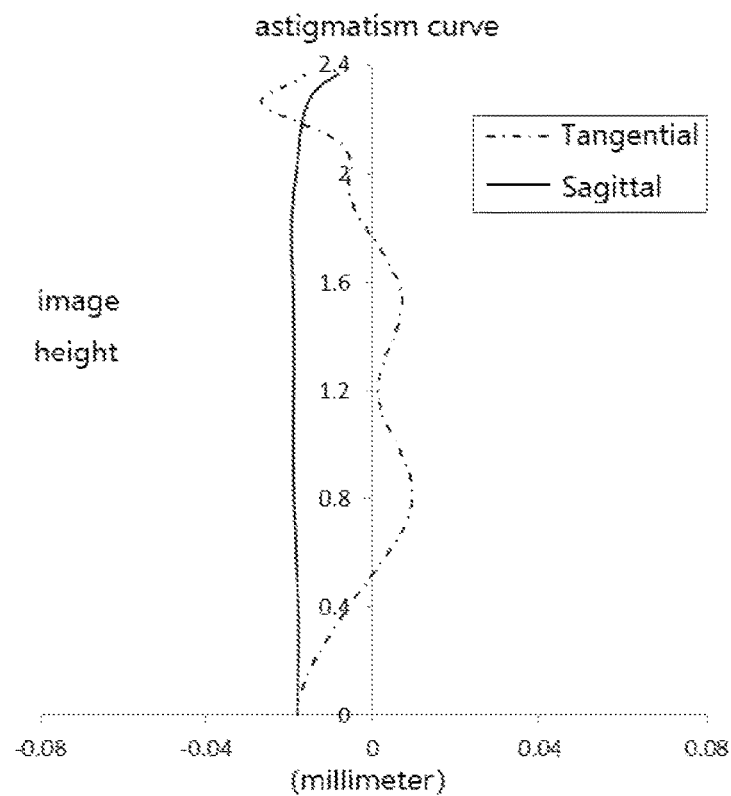
Figure 16C:
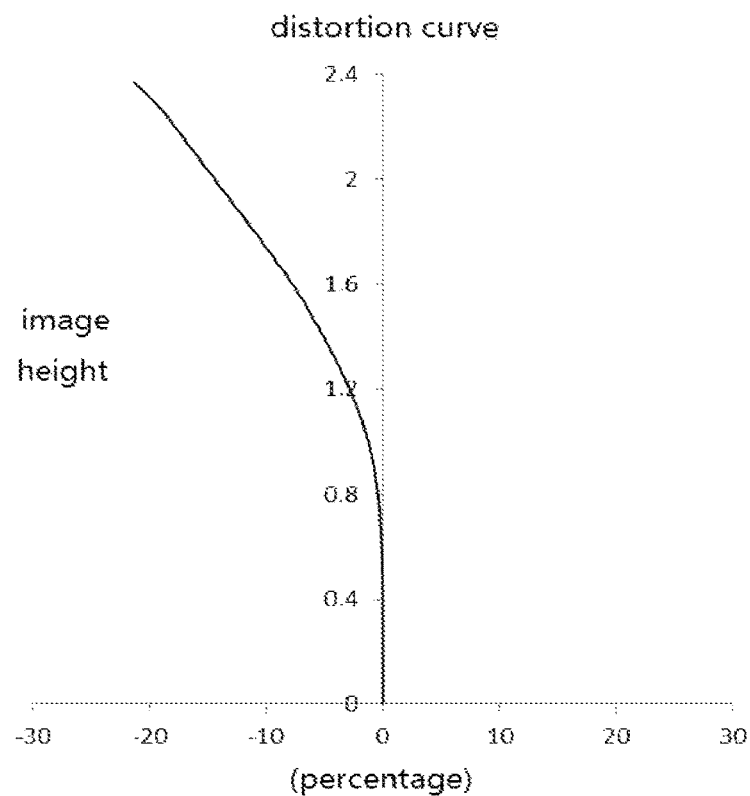
Figure 16D:
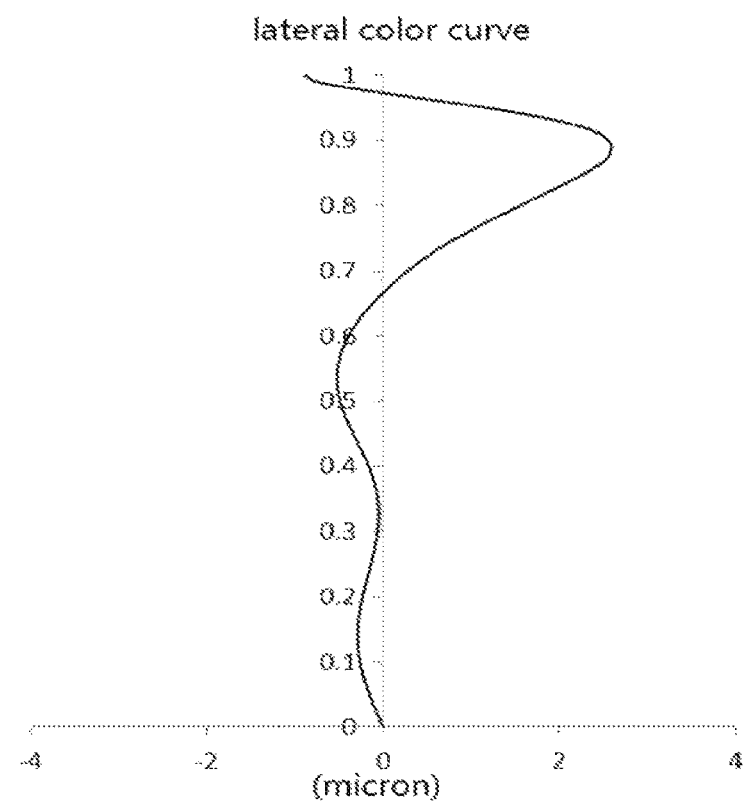

FIG. 16A shows a longitudinal aberration curve of the optical imaging system of Embodiment 8, which represents deviations of convergence focal points after light of different wavelengths passes through the system. FIG. 16B shows an astigmatism curve of the optical imaging system of Embodiment 8, which represents a meridional field curvature and a sagittal field curvature. FIG. 16C shows a distortion curve of the optical imaging system of Embodiment 8, which represents distortion values at different image heights. FIG. 16D shows a lateral color curve of the optical imaging system of Embodiment 8, which represents deviations of different image heights on the imaging surface after light passes through the system. From FIGS. 16A to 16D, it can be determined that the optical imaging system provided in Embodiment 8 can achieve a good imaging quality.

In conclusion, Embodiment 1 to Embodiment 8 respectively satisfy the relationships shown in Table 25.

TABLE 25

| Conditional expression/ Embodiment | 1 | 2 | 3 | 4 | 5 | 6 | 7 | 8 |
|---|---|---|---|---|---|---|---|---|
| R7/f | 0.58 | 0.62 | 0.60 | 0.48 | 0.51 | 0.47 | 1.32 | 0.55 |
| \|R8 − R9\| | 0.06 | 0.18 | 0.09 | 0.24 | 0.21 | 0.28 | 1.74 | 0.04 |
| R7/R8 | 1.16 | 1.00 | 1.19 | 1.01 | 1.09 | 1.03 | 0.76 | 1.20 |
| TTL/ImgH | 1.60 | 1.46 | 1.46 | 1.53 | 1.44 | 1.50 | 1.37 | 1.58 |
| f5/f − f6/f | 1.82 | 1.33 | 1.24 | 1.12 | 1.37 | 1.36 | 1.17 | 1.78 |
| f45/EPD | 2.28 | 1.62 | 1.59 | 1.30 | 1.06 | 1.28 | 1.37 | 2.33 |
| R9/R11 | −0.81 | −0.91 | −0.71 | −0.69 | −0.72 | −0.74 | −1.04 | −0.76 |
| (R1 + R6)/ (R1 − R6) | 0.45 | −0.08 | −0.12 | −0.37 | −0.50 | −0.63 | −0.77 | 0.40 |
| DT61/DT11 | 2.04 | 2.47 | 2.56 | 2.53 | 2.45 | 2.53 | 2.39 | 2.16 |
| \|SAG32/CT3\| | 0.63 | 1.04 | 1.07 | 0.94 | 0.67 | 0.69 | 0.56 | 0.62 |
| CT3/(CT1 + CT2 + CT4) | 1.12 | 0.55 | 0.53 | 0.58 | 1.12 | 0.94 | 0.87 | 1.14 |

The disclosure further provides an imaging device, an electronic photosensitive element of the imaging device may be a charge coupled device (CCD) or a complementary metal oxide semiconductor (CMOS) element. The imaging device may be an independent imaging apparatus such as a digital camera, or may be an imaging module integrated in a mobile electronic apparatus such as a mobile phone. The imaging device is equipped with the optical imaging system described above.

The descriptions above only relate to the preferred examples of the disclosure and are illustrations of the technical principles employed. A person skilled in the art should understand that the scope of the invention involved in the disclosure is not limited to the technical solutions formed by the specific combination of the described technical features, and should also cover other technical solutions formed by any combination of the described technical features or equivalent features thereof without departing from the inventive concept, for example, technical solutions formed by mutual replacement between the described features and technical features having similar functions disclosed (but not limited thereto) in the disclosure.

What is claimed is:

1. An optical imaging system comprising, sequentially from an object side to an image side along an optical axis, a first lens, a second lens, a third lens, a fourth lens, a fifth lens, and a sixth lens, wherein
    the first lens has a focal power, and an object side surface thereof is a convex surface;
    the second lens has a focal power;
    the third lens has a focal power, and an image side surface thereof is a convex surface;
    the fourth lens has a focal power, an object side surface thereof is a convex surface, and an image side surface thereof is a concave surface;
    the fifth lens has a positive focal power, and an object side surface thereof is a convex surface;
    the sixth lens has a negative focal power, and an object side surface thereof is a concave surface; and
    a maximum half field of view (HFOV) of the optical imaging system satisfies 50°<HFOV<60°, and a curvature radius R7 of the object side surface of the fourth lens and a total effective focal length f of the optical imaging system satisfy 0.4<R7/f<1.5.

2. The optical imaging system as claimed in claim 1, wherein the curvature radius R7 of the object side surface of the fourth lens and a curvature radius R8 of the image side surface of the fourth lens satisfy 0.6<R7/R8<1.5.

3. The optical imaging system as claimed in claim 1, wherein an effective focal length f5 of the fifth lens, an effective focal length f6 of the sixth lens, and the total effective focal length f of the optical imaging system satisfy 1<f5/f–f6/f<2.

4. The optical imaging system as claimed in claim 1, wherein a curvature radius R8 of the image side surface of the fourth lens and a curvature radius R9 of the object side surface of the fifth lens satisfy |R8–R9|<2.

5. The optical imaging system as claimed in claim 1, wherein a curvature radius R9 of the object side surface of the fifth lens and a curvature radius R11 of the object side surface of the sixth lens satisfy –1.2<R9/R11<–0.5.

6. The optical imaging system as claimed in claim 1, wherein a curvature radius R1 of the object side surface of the first lens and a curvature radius R6 of the image side surface of the third lens satisfy –1<(R1+R6)/(R1–R6)<0.5.

7. The optical imaging system as claimed in claim 1, wherein a maximum effective radius DT11 of the object side surface of the first lens and a maximum effective radius DT61 of the object side surface of the sixth lens satisfy 2<DT61/DT11<3.

8. The optical imaging system as claimed in claim 1, wherein an axial distance SAG32 from an intersection point between the image side surface of the third lens and the optical axis to an effective radius vertex of the image side surface of the third lens and a center thickness CT3 of the third lens on the optical axis satisfy 0.5<|SAG32/CT3|<1.2.

9. The optical imaging system as claimed in claim 1, wherein ImgH is a half of a diagonal length of an effective pixel region on an imaging surface of the optical imaging system, TTL is a Total Track Length from the object side surface of the first lens to an imaging surface of the optical imaging system, and ImgH and TTL satisfy TTL/ImgH≤1.6.

10. The optical imaging system as claimed in claim 1, wherein a combined focal length f45 of the fourth lens and the fifth lens and an entrance pupil diameter (EPD) of the optical imaging system satisfy 1<f45/EPD<2.5.

11. The optical imaging system as claimed in claim 1, wherein a center thickness CT1 of the first lens on the optical axis, a center thickness CT2 of the second lens on the optical axis, a center thickness CT3 of the third lens on the optical axis, and a center thickness CT4 of the fourth lens on the optical axis satisfy 0.5<CT3/(CT1+CT2+CT4)<1.3.

12. An optical imaging system comprising, sequentially from an object side to an image side along an optical axis, a first lens, a second lens, a third lens, a fourth lens, a fifth lens, and a sixth lens, wherein the first lens has a positive focal power, and an object side surface thereof is a convex surface;
the second lens has a focal power;
the third lens has a focal power, and an image side surface thereof is a convex surface;
the fourth lens has a focal power, an object side surface thereof is a convex surface, and an image side surface thereof is a concave surface;
the fifth lens has a positive focal power, and an object side surface thereof is a convex surface;
the sixth lens has a negative focal power, and an object side surface thereof is a concave surface; and
a maximum half field of view (HFOV) of the optical imaging system satisfies 50°<HFOV<60°, and
a curvature radius R8 of the image side surface of the fourth lens and a curvature radius R9 of the object side surface of the fifth lens satisfy |R8–R9|<2.

13. The optical imaging system as claimed in claim 12, wherein a curvature radius R7 of the object side surface of the fourth lens and the curvature radius R8 of the image side surface of the fourth lens satisfy 0.6<R7/R8<1.5.

14. The optical imaging system as claimed in claim 12, wherein an effective focal length f5 of the fifth lens, an effective focal length f6 of the sixth lens, and a total effective focal length f of the optical imaging system satisfy 1<f5/f–f6/f<2.

15. The optical imaging system as claimed in claim 12, wherein the curvature radius R9 of the object side surface of the fifth lens and a curvature radius R11 of the object side surface of the sixth lens satisfy –1.2<R9/R11<–0.5.

16. The optical imaging system as claimed in claim 12, wherein a curvature radius R7 of the object side surface of the fourth lens and a total effective focal length f of the optical imaging system satisfy 0.4<R7/f<1.5.

17. The optical imaging system as claimed in claim 12, wherein a curvature radius R1 of the object side surface of the first lens and a curvature radius R6 of the image side surface of the third lens satisfy –1<(R1+R6)/(R1–R6)<0.5.

18. The optical imaging system as claimed in claim 12, wherein a maximum effective radius DT11 of the object side surface of the first lens and a maximum effective radius DT61 of the object side surface of the sixth lens satisfy 2<DT61/DT11<3.

19. The optical imaging system as claimed in claim 12, wherein an axial distance SAG32 from an intersection point between the image side surface of the third lens and the optical axis to an effective radius vertex of the image side surface of the third lens and a center thickness CT3 of the third lens on the optical axis satisfy 0.5<|SAG32/CT3|<1.2.

20. The optical imaging system as claimed in claim 12, wherein TTL is a Total Track Length from the object side surface of the first lens to an imaging surface of the optical imaging system, ImgH is a half of a diagonal length of an effective pixel region on an imaging surface of the optical imaging system, and ImgH and TTL satisfy TTL/ImgH≤1.6.

* * * * *